US012620841B2

(12) United States Patent
Lee et al.

(10) Patent No.: US 12,620,841 B2
(45) Date of Patent: May 5, 2026

(54) STATOR HAVING BUS BAR STRUCTURE, PROPELLER DRIVING MOTOR USING SAME, AND METHOD FOR MANUFACTURING STATOR

(71) Applicant: AMOTECH CO., LTD., Incheon (KR)

(72) Inventors: Jeong Hoon Lee, Incheon (KR); Chang Seob Song, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 198 days.

(21) Appl. No.: 18/294,539

(22) PCT Filed: Jul. 21, 2022

(86) PCT No.: PCT/KR2022/010691
§ 371 (c)(1),
(2) Date: Feb. 15, 2024

(87) PCT Pub. No.: WO2023/018053
PCT Pub. Date: Feb. 16, 2023

(65) Prior Publication Data
US 2025/0105680 A1    Mar. 27, 2025

(30) Foreign Application Priority Data

Aug. 9, 2021    (KR) ........................ 10-2021-0104396

(51) Int. Cl.
*H02K 1/14*          (2006.01)
*H02K 3/18*          (2006.01)
(Continued)

(52) U.S. Cl.
CPC ................. *H02K 1/14* (2013.01); *H02K 3/18* (2013.01); *H02K 5/04* (2013.01); *H02K 7/14* (2013.01); *H02K 15/022* (2013.01); *H02K 15/10* (2013.01)

(58) Field of Classification Search
CPC .. H02K 1/14; H02K 3/18; H02K 5/04; H02K 7/14; H02K 15/022; H02K 15/10
(Continued)

(56) References Cited

U.S. PATENT DOCUMENTS 4,549,103 A * 10/1985 Shiga ........................ H02K 9/06
                                                      417/353
2004/0245878 A1* 12/2004 Kim ........................ H02K 29/08
                                                      310/114

(Continued)

FOREIGN PATENT DOCUMENTS

CN        112953150 A * 6/2021 ............... H02K 3/28
DE  102021120756 A1 * 2/2022 ............... H02K 5/10
(Continued)

OTHER PUBLICATIONS

International Search Report—PCT/KR2022/010691 dated Oct. 28, 2022.

*Primary Examiner* — Jose A Gonzalez Quinones
(74) *Attorney, Agent, or Firm* — CANTOR COLBURN LLP

(57) ABSTRACT

A stator having a bus bar structure that enhances assembly productivity and durability by adopting the bus bar structure comprises: a division type stator core in which a plurality of split cores are assembled in an annular shape; upper and lower insulators surrounding the outer circumference of teeth of the split cores; a stator coil composed of a plurality of core groups continuously wound onto three teeth for each phase; a plurality of bus bar brackets coupled to the insulators so as to bind two split cores; U-phase, W-phase, and V-phase bus bars on which a connection terminal to which a start terminal of each core group is connected is protruded; a common electrode bus bar on which a connection terminal to which an end terminal of each core group is connected is (Continued)

protruded; and a stator support that insulates between coils so as to integrate the plurality of split cores.

13 Claims, 22 Drawing Sheets

(51) Int. Cl.

| | |
|---|---|
| *H02K 5/04* | (2006.01) |
| *H02K 7/14* | (2006.01) |
| *H02K 15/022* | (2025.01) |
| *H02K 15/10* | (2025.01) |

(58) Field of Classification Search

USPC ................................................ 310/67 R, 208

See application file for complete search history.

(56) References Cited

U.S. PATENT DOCUMENTS

| | | | | |
|---|---|---|---|---|
| 2016/0301267 | A1* | 10/2016 | Hoemann | H02K 21/22 |
| 2018/0079945 | A1* | 3/2018 | Kim | C08K 3/38 |
| 2018/0097416 | A1 | 4/2018 | Dang | |
| 2022/0224183 | A1* | 7/2022 | Lee | H02K 5/225 |

FOREIGN PATENT DOCUMENTS

| | | | | |
|---|---|---|---|---|
| EP | 3460960 | A1* | 3/2019 | H02K 3/521 |
| JP | 2013070595 | A | 4/2013 | |
| KR | 20120058765 | A | 6/2012 | |
| KR | 20150057566 | A | 5/2015 | |
| KR | 20170090037 | A | 8/2017 | |
| KR | 20180021564 | A | 3/2018 | |

* cited by examiner

STATOR HAVING BUS BAR STRUCTURE, PROPELLER DRIVING MOTOR USING SAME, AND METHOD FOR MANUFACTURING STATOR

TECHNICAL FIELD

The present invention relates to a stator having a bus bar structure and a propeller driving motor using same and, more specifically, to a stator having a bus bar structure with improved assembly productivity and durability by adopting a bus bar structure, and a propeller driving motor using same and a method for manufacturing the stator.

BACKGROUND ART

Typically, a brushless electric motor used for an aircraft includes: a stator to which a battery is connected; a rotor; and a case wherein a propeller is mounted.

In this case, since the case serves as a rotor in the case of the electric motor for an aircraft, the case itself rotates to rotate the propeller, thereby generating the propulsion force of the aircraft.

In addition, since the case itself rotates in the case of the electric motor for an aircraft, thereby generating high torque. In addition, a large propeller can be directly turned without a reducer, and the electric motor can be lightened since an accessory such as a reducer is not required.

However, in the case of the electric motor, since the case itself rotates as a rotor, a lot of heat is generated from the stator placed inside the case. In this case, if the aircraft is fast, the electric motor is cooled by the flow of air, but in the case of helicopters that mainly fly at rest, the electric motor is overheated due to little air flow, and thus is required to be cooled.

To this end, in the case of the electric motor used for an aircraft, an upper plate of the case is typically perforated, or a plurality of cooling holes formed by being cut in a predetermined area are provided. Therefore, when the electric motor is driven, air flows into the cooling holes of the case through the air flow caused by the rotation of the propeller, thereby cooling the electric motor.

However, when the electric motor is driven and the case rotates at a constant speed, rain, moisture, and other foreign substances are not likely to enter the case by the rotational force of the case, but if the aircraft is stopped and located outside, foreign substances such as rainwater, moisture, or dust may enter the case through the cooling hole of the case.

Foreign substances such as rainwater, moisture, or dust introduced in this way may cause electrical short circuits or fires due to short circuits.

Therefore, in order to solve this problem, measures such as covering the electric motor with a tarp such as vinyl were previously taken, but these measures are temporary and cumbersome, so they are not a fundamental solution to the problem.

Korean Patent Application Publication No. 10-2017-0090037 (Patent Document 1) discloses a power transmission device for an aircraft having a function of preventing moisture penetration and preventing overheating, which is capable of effectively implementing a cooling function of an electric motor, by introducing an opening and closing control means that can open and close the cooling hole of the case formed to cool the electric motor, thereby preventing moisture or foreign substances from entering the electric motor by automatically closing the cooling hole of the case when the aircraft is stopped, as well as enabling the opening and closing control means to adjust the opening amount of the cooling hole of the case according to the rotational force of the case when the aircraft operates, to thus effectively implement the cooling function of the electric motor.

In general, the electric motor generates more heat in a stator in which a motor driving current is applied to the coil than a rotor, and when the heat generated in this way is not discharged to the outside of the electric motor, the heat may act as a factor of lowering the efficiency and lifespan of the motor.

The electric motor of Patent Document 1 has a structure in which a stator is located in a central portion in an outer rotor scheme. Patent Document 1 includes a cooling hole through which air for air cooling is introduced into and discharged from a front surface and a rear surface of a cylindrical case serving as a rotor.

The electric motor of Patent Document 1 has a structure in which a stator is located in a central portion in an outer rotor scheme. Patent Document 1 includes a cooling hole through which air for air cooling is introduced into and discharged from a front surface and a rear surface of a cylindrical case serving as a rotor.

Meanwhile, an unmanned aerial vehicle (UAV), that is, a drone, is variously applied to various purposes such as surveillance/reconnaissance/search, disinfection/control/spray, broadcast/performance, environmental measurement, lifesaving, and flying cars, in addition to a logistics field for delivering parcel items.

Propeller-driven motors, especially brushless direct-current (BLDC) motors, which are used in light airplanes for two people, fling cars, and large drones carrying high-weight loads, require several tens of kV driving motors, and in this case, an outer rotor-type motor (Patent Document 1) in which a stator with a coil wound around a core is placed inside has a limitation in effectively cooling a lot of heat generated from the stator.

Heat generated from the stator and accumulated therein without being dissipated to the outside may shorten the operating life of the motor, lead to an inoperable state in accordance with the occurrence of a failure, and reduce operation efficiency. In order to prevent this, a heat dissipation member or a heat dissipation device such as a heat sink or a heat exchanger is used together with a heating device.

Accordingly, a heat dissipation member manufactured using injection molding or extrudable polymer resin has recently been proposed, and many studies have continued due to the advantages of lightweight and low cost due to the material properties of the polymer resin itself.

However, heat-dissipating members manufactured using the polymer resin may have heat-dissipating properties through thermally conductive fillers, but the thermally conductive fillers with excellent heat-dissipating performance usually have electrical conductivity as well. Accordingly, since the heat dissipation member implemented using a polymer resin containing a thermally conductive filler expresses electrical conductivity at the same time, it is very inappropriate to use the heat dissipation member in an electronic device requiring insulation.

In particular, in the case of an aviation motor, it is required to have insulation performance to avoid lightning.

In addition, alternating-current (AC) motors are not suitable for aviation motors because they have a larger volume and weight than BLDC motors.

DISCLOSURE

Technical Problem

The inventors of this invention simultaneously have realized inner air cooling by forming a plurality of through holes between the upper and lower covers and a plurality of bridges connecting the rotor body with a rotary shaft as well as realizes outer air cooling through a natural side casing while placing the stator that generates more heat than the rotor outside, and have discovered that problems in which moisture or foreign substances enter the motor due to the inner air cooling and cause an electrical short or fire may be prevented by separating and blocking the stator by insert molding using an insulating heat dissipation composite material, thereby preventing the occurrence of the electrical short or fire.

A large size of a multi-slot/multipolar structure is required to implement a high-power driving motor of several tens of kV. When a motor structure is enlarged, a coil winding method for a plurality of teeth of a stator core and a core loss discarded during a manufacturing process of the stator core are important factors that greatly affect motor manufacturing cost and motor performance.

A stator having an integrated core structure in which a plurality of teeth extends in a radial direction from a back yoke is more expensive than a split core type stator formed by assembling a plurality of split cores, in terms of a cost of equipment investment and coil winding costs of an expensive dedicated winding machine required for coil winding. In the case of the split core, the core loss may be reduced and the winding may be easily made using a low-cost universal winding machine.

In addition, in the case of a split-core stator, winding a three-phase drive coil around a plurality of split cores and then connecting the start and end terminals of each coil in a star-connection or delta-connection method may require a lot of work and deteriorate assembly workability.

An objective of the present invention is to provide a stator and a propeller driving motor using same, in which a plurality of split cores are assembled by an insulator formed of an insulating heat dissipation composite material, a three-phase driving coil is wound by a three-connection method, and a plurality of coil-wound split cores are insert-molded into an insulating heat dissipation composite material, to thus be integrated into an annular shape and sealed, thereby fundamentally solving the occurrence of electrical short circuits even if moisture or foreign substances are introduced into the motor along an inner air-cooling flow path together with a heat dissipation effect.

Another objective of the present invention is to provide a stator and a propeller driving motor using same, wherein assembly productivity is increased by connecting a start terminal and an end terminal of a coil by using a bus bar and a bus bar bracket, and circuit stability may be promoted even in high-temperature heat generated when a large amount of current flows from a terminal to a stator coil.

Another objective of the present invention is to provide a stator and a propeller driving motor using same, which can reduce a coil temperature and increase efficiency by reducing resistance and coil loss by minimizing the coil resistance by connecting a plurality of coils in parallel for each phase.

Another objective of the present invention is to provide a split stator capable of suppressing the movement of each of split cores even when insert-molding for integrally forming a stator support by forming a primary temporary assembly temporarily assembled by an uneven coupling structure of a back yoke part of the split cores and forming a secondary temporary assembly using a bus bar and a bus bar bracket to enhance the coupling force between the split cores, to solve insufficient coupling force of the primary temporary assembly and a method for manufacturing the stator.

Technical Solution

According to an embodiment of the present invention, there is provided a stator having a bus bar structure including: a split type state core in which a plurality of split cores, each tooth extending in a center direction from a back yoke part forming a magnetic circuit, are annularly assembled; upper and lower insulators which are combined to surround an outer peripheral surface of the teeth of the split cores from above and below; a three-phase driving type stator coil which is wound around an outer circumference of each of the insulators and includes a plurality of core groups which are continuously wound around three teeth adjacent for each phase, wherein the core groups on each phase are connected in parallel and are alternately arranged for each phase; a plurality of bus bar brackets coupled to one of the upper insulator and the lower insulator so as to bind two adjacent split cores, respectively, and each having four guide channels; U-phase, W-phase, and V-phase bus bars, each inserted and fixed to one of the four guide channels, in which a plurality of connection terminals to which start terminals of each core group are connected, protrude at intervals; a common electrode bus bar inserted into one of the four guide channels to be fixed, in which a plurality of connection terminals to which end terminals of each core group are connected, protrude at intervals; and a stator support which surrounds the stator coil wound on the insulators so as to integrate the plurality of split cores, and insulates between the adjacent coils.

The plurality of bus bar brackets may be positioned to bind a front end insulator coupled to a rear end split core of a front core group among adjacent core groups and a rear end insulator coupled to a front end split core of a rear end core group.

In addition, each of the bus bar brackets has first and second coupling holes coupled to coupling protrusions of the insulators, respectively, a first coupling protrusion of the front insulator and a second coupling protrusion of the rear insulator are coupled to the first and second coupling holes, respectively, and an insulator not coupled to the bus bar bracket may be arranged before and after the front insulator and the rear insulator coupled to the bus bar bracket.

The upper insulator and the lower insulator include a pair of flanges protruding inward and outward, and a coil winding region formed between the pair of flanges having a hollow part surrounding a teeth therein, and a coupling protrusion required to couple and fix the bus bar bracket protrudes from an outer flange of the lower insulator.

In addition, the bus bar bracket may include: a rectangular base part; inner and outer side walls protruding from an inner circumference and an outer circumference of the base part, respectively; three-row guide protrusions protruding to form four guide channels to which U-phase, V-phase, and W-phase bus bars and a common electrode bus bar are coupled and fixed between the inner side wall and the outer side wall; and first and second protrusion parts protruding from both ends of the outer side wall and having first and second coupling holes respectively coupled to the coupling protrusions of the lower insulator.

The U-phase, V-phase, and W-phase bus bars each have a plurality of connection terminals protruding in which an output terminal to which one end of a cable is connected and start terminals of a plurality of core groups allocated on the U-phase, V-phase, and W-phase, are connected, the common electrode bus bar has a plurality of connection terminals to which a plurality of end terminals of the plurality of core groups are connected and an output terminal for a common electrode to which one end of the cable is connected, in which the plurality of connection terminals and the output terminal for a common electrode protrude, and The output terminals of the U-phase, V-phase, and W-phase bus bars, the plurality of connection terminals to which the start terminals of each core group are connected, the plurality of connection terminals of the common electrode bus bars, and the output terminal for the common electrode may have intervals which are set to be located in the guide channels of the bus bar brackets.

In addition, one of the plurality of connection terminals of U-phase, W-phase, and V-phase bus bars, to which a start terminal of the core group for each U-phase, each V-phase, and each W-phase is connected, and one of the plurality of connection terminals of a common electrode bus bar to which an end terminal of each of the plurality of core groups is connected may be arranged in each of the plurality of bus bar brackets, and the connection terminal may be arranged at a position close to the start terminal and the end terminal of each core group arranged in an annular shape to minimize a coil length.

Six successive teeth included in the core groups of two adjacent phases may generate magnetic flux in opposite directions to rotate the magnet of the rotor arranged opposite to each other in the same direction.

The coil of the stator includes 12 core groups. The core groups in each phase are connected in parallel by four. Two adjacent core groups are activated for each conduction mode. One deactivated core group is arranged between the two activated adjacent core groups. The activated eight core groups and the deactivated four core groups arranged therebetween may be symmetrically arranged around a rotating shaft.

In addition, according to another embodiment of the present invention, there is provided a propeller driving motor including: a housing in which an upper cover and a lower cover are respectively coupled to an upper portion and a lower portion of a cylindrical case; a stator arranged inside the case of the housing and generating a rotating magnetic field; a rotor rotated by the rotating magnetic field of the stator; and a rotating shaft coupled to a center of the rotor and having a propeller coupled to a front end portion.

The driving motor may include a plurality of through holes provided in the upper cover from the outside, a plurality of spaces formed between a plurality of bridges connecting the rotating shaft and the rotor, and a plurality of through holes provided in the lower cover.

In this case, the rotor includes upper and lower blade support plates installed at a top and a bottom thereof, and each of the upper and lower blade support plates includes a plurality of blades that generate a circumferential wind when the rotor rotates, and the circumferential wind collides with the air cooling air flow penetrating the motor to generate a vortex.

The propeller driving motor according to one embodiment of the present invention further includes a water jacket having a spiral refrigerant circulation circuit arranged between the cylindrical case and the stator and capable of refrigerant circulation between the case and the stator, and the stator support may be radiated through the water jacket installed outside.

In addition, the insulator and the stator support of the stator include an insulating heat dissipation composite material having heat dissipation performance and insulation performance at the same time, and the insulating heat dissipation composite material may have an insulation performance of at least 10 kV and a thermal conductivity of 3 W/mK or more.

According to another embodiment of the present invention, there is provided a method of manufacturing a stator including: assembling upper and lower insulators to each of a plurality of split cores; preparing a plurality of core groups each having a start terminal and an end terminal by continuously winding a coil in a forward direction, a reverse direction, and a forward direction to three consecutive split cores in which the upper and lower insulators are assembled, respectively; alternately arranging the plurality of core groups for each phase of U, V, and W, and assembling an uneven coupling unit of a back yoke part between adjacent split cores to form an annular primary temporary assembly; coupling a rear end insulator coupled to a rear end split core and a front end insulator coupled to a front end split core by using each of a plurality of bus bar brackets to bind the rear end split core of a front end core group among the adjacent core groups and the front end split core of a rear end core group; assembling, in four guide channels formed in each of the bus bar brackets, the W-phase, V-phase, and U-phase bus bars in which respective connection terminals (core group number/3) protrude, with a common electrode bus bar in which the same number of connection terminals as the plurality of core groups protrude; forming a secondary temporary assembly by connecting a start terminal of each phase core group to a connection terminal of each phase bus bar and connecting an end terminal to a connection terminal of the common electrode bus bar; and obtaining an integrated stator by integrally forming the stator support with the secondary temporary assembly by insert-molding an insulating heat dissipation composite after installing the secondary temporary assembly in a mold.

When the rear end insulator coupled to the rear end split core and the front end insulator coupled to the front end split core are coupled using the plurality of bus bar brackets, the coupling protrusions of the rear end insulator and the front end insulator may be coupled to the first and second coupling holes provided in the bus bar bracket.

In addition, one of the plurality of connection terminals of the W-phase, V-phase, and U-phase bus bars and one of the plurality of connection terminals of the common electrode bus bar may be arranged on each of the bus bar brackets.

In this case, when one of the plurality of connection terminals of the W-phase, V-phase, and U-phase bus bars is arranged for each bus bar bracket, the bus bar brackets may be aligned and arranged in one of split protrusions of three rows and four columns provided for each bus bar bracket.

Moreover, a start terminal of each phase core group is connected to a connection terminal of each phase bus bar, and an end terminal thereof is connected to a connection terminal of the common electrode bus bar to form a parallel connection circuit.

According to another embodiment of the present invention, there is provided a method of manufacturing a stator including: assembling upper and lower insulators to each of a plurality of split cores; preparing a plurality of core groups each having a start terminal and an end terminal by continuously winding a coil in a forward direction, a reverse direction, and a forward direction to three consecutive split cores in which the upper and lower insulators are assembled, respectively; alternately arranging the plurality of core groups for each phase of U, V, and W, and assembling an uneven coupling unit of a back yoke part between adjacent split cores to form an annular primary temporary assembly;

coupling a rear end insulator coupled to a rear end split core and a front end insulator coupled to a front end split core by using each of a plurality of bus bar brackets to bind the rear end split core of a front end core group among the adjacent core groups and the front end split core of a rear end core group; assembling, in four guide channels formed in each of the bus bar brackets, the W-phase, V-phase, and U-phase bus bars in which respective connection terminals (core group number/3) protrude, with a common electrode bus bar in which the same number of connection terminals as the plurality of core groups protrude; forming a secondary temporary assembly by connecting a start terminal of each phase core group to a connection terminal of each phase bus bar and connecting an end terminal to a connection terminal of the common electrode bus bar; and integrating the stator with a water jacket by installing the secondary temporary assembly inside the water jacket and forming a stator support by insert molding an insulating heat dissipation composite material.

Advantageous Effects

As described above, according to the present invention, a plurality of split cores are assembled by an insulator formed of an insulating heat dissipation composite material, a three-phase driving coil is wound by a three-connection method, and then a plurality of coil-wound split cores are insert-molded into an insulating heat dissipation composite material, thereby being integrated into an annular shape and sealing-treated, thereby obtaining a heat dissipation effect as well as fundamentally solving the occurrence of electrical short circuits even if moisture or foreign matter flows into the motor along an inner air-cooling flow path.

In addition, in this invention, by minimizing the resistance of the coil between respective core groups when winding the coil in a three-connection method, resistance and coil loss may be reduced to lower the coil temperature and increase efficiency. As described above, when the coil is wound in a three-connection method and three split cores which are three-connected are connected in parallel for each core group, a start terminal of a coil wound around the split core is connected to three-phase terminals U, V, and W of an inverter circuit and an end terminal is connected to a common electrode terminal COM.

Moreover, when manufacturing a motor with a 36-slot/32-pole structure as in this invention, 12 core groups consisting of three split cores which are three-connected need to connect start and end terminals of a coil to a terminal for each phase or a common electrode terminal.

In addition, in the case of a high-power motor, it is desirable to use a bus bar for each phase to ensure circuit stability at an electrical connection point between start and end terminals of a coil even in high-temperature heat when a large current flows from the terminal to a stator coil.

Moreover, when 12 core groups consisting of three split cores which are three-connected are connected in a parallel connection method to constitute a circuit, and the start and end terminals of a coil of each core group are connected to a plurality of bus bars using a plurality of bus bar brackets, and when insert-molding an insulating heat-radiating composite material so as to integrate the core groups into an annular shape, it is preferable to use a plurality of bus bar brackets to fix the plurality of bus bars in order to keep a preset position stable.

In this invention, to implement a high-power motor as described above, 36 split cores are assembled with an insulator, a coil is wound in a three-connection method, and then these split cores are insert-molded as an insulating heat-dissipating composite material to form a circuit in a parallel connection method by four core groups for each phase while integrating the core groups into an annular shape. To this end, using a bus bar and a bus bar bracket is an important factor in increasing assembly productivity and durability of the connection.

In other words, after an insulator is assembled in 36 split cores, 12 core groups which are coil-wound are installed in an insert molding mold in a state of being temporarily assembled in an annular state and insert molding is carried out with an insulating heat dissipation composite material. In this case, if there is no support from the bus bar and the bus bar bracket that maintain a temporary assembly state, a preset position may not be maintained due to a pressure at the time of molding.

The present invention provides a method of manufacturing a stator comprehensively considering a three-connection method of a coil for employing bus bars required for high-power driving motors, increasing the efficiency of a motor, and reducing noise and vibration, while reinforcing insufficient bonding force according to an uneven coupling structure of a back yoke part of a split core, when manufacturing an annular stator integrated by insert molding in an annularly temporarily assembled state after winding a coil around a plurality of split cores.

In the present invention, when three-phase coils are wound on the teeth of the split-type stator core in a three-connection method in which the coils are continuously wound on the three teeth in the order of a forward direction, a reverse direction, and a forward direction for each core group of each phase, and when the motor driving signal of the same phase is applied to the three consecutive coils, all three split cores (teeth) generate a magnetic flux that rotates the magnet of the opposing rotor in the same direction, thereby effectively transmitting a force to the rotor.

Moreover, in the present invention, coil winding is performed in a three-connection method, so that the three split cores (teeth) operate like one set. Thus, even if there is an overlap between the adjacent S-pole and N-pole magnets in the single rotor facing the leading end of the split core (teeth), an effective magnetic flux path is set to increase the effective area of the magnet and to increase efficiency.

According to the present invention, the winding direction and the driving signal of the three-phase driving circuit are switched so that the adjacent split cores (teeth) generate magnetic flux in opposite directions to each other. Accordingly, attractive force and repulsive force are simultaneously generated in the same direction with respect to the rotor set to have opposite polarities, and thus rotation driving of the single rotor may be effectively carried out.

In addition, in this invention, a ratio between a stator slot and a rotor pole may be minimized, thereby promoting low cogging noise and increasing efficiency.

An excellent heat dissipation effect may be obtained by forming an insulator (or a bobbin) insulating spaces between a stator core and a coil as an insulating heat dissipation composite material having heat dissipation performance and insulation performance at the same time, to thereby achieve improvement of motor efficiency. Moreover, an insulator (or a bobbin) is formed of an insulating heat dissipation composite material, to thereby provide a propeller driving motor capable of assuring mechanical strength such as tensile strength, flexural modulus, and the like which can support external force as well as heat dissipation performance and insulation performance.

In addition, in the present invention, problems in which moisture or foreign substances are introduced into a motor according to inner air cooling to thereby cause an electrical short or fire can be solved together with a heat dissipation effect by insert-molding an insulating heat dissipation composite material having both heat dissipation performance and insulation performance so as to insulate spaces between wound coils while surrounding the coil wound around an insulator (or bobbin) of the stator. When insert-molded with the insulating heat dissipation composite material, the stator is formed to cover all portions exposed to the outside except the shoe portion of the stator core facing the magnet of the rotor.

Furthermore, in the present invention, heat dissipation performance may be maximized by varying the composition of a first insulating heat dissipation composite material used to form an insulator (or bobbin) insulating spaces between a stator core and a coil, and a second insulating heat dissipation composite material coated by an insert molding method so as to insulate spaces between the coils while surrounding the coil wound around the insulator (or bobbin).

In the propeller driving motor according to the present invention, an inner rotor-outer stator type BLDC motor is used, and the rotor and the stator may be effectively cooled by outer air cooling and inner air cooling.

In addition, in this invention, by forming a plurality of through holes in upper and lower covers and simultaneously connecting a rotor body with a rotary shaft through a plurality of bridges, effective cooling can be achieved by inner air cooling through the plurality of through holes.

BEST MODE FOR CARRYING OUT THE INVENTION

Figure 1A:
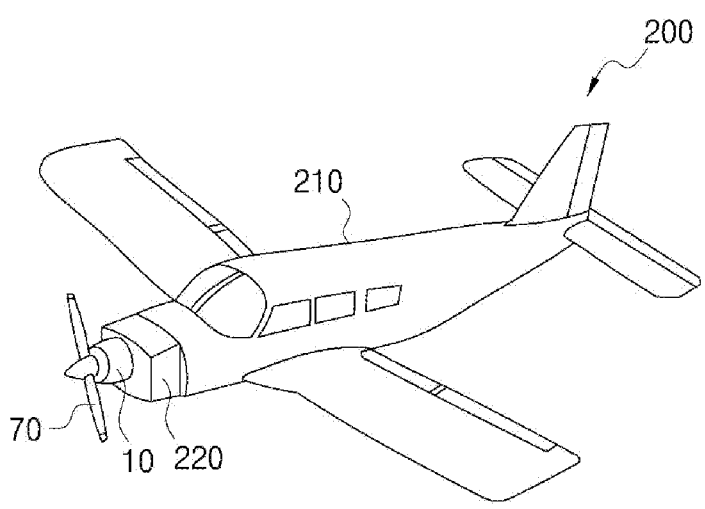
FIGS. 1A to 1C are perspective views respectively showing a propeller light aircraft to which a propeller driving motor according to the present invention is applied, showing a coupling structure between a propeller and a propeller driving motor, and showing an internal structure of a propeller driving motor.

Hereinafter, embodiments of the present invention will be described in detail with reference to the accompanying drawings.

The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

The propeller driving motor according to the present invention may be applied to, for example, a light airplane for two people, a flying car, a large drone carrying a high weight load, and the like, and a large BLDC motor of several tens of Kw is required as the propeller driving motor.

When a large BLDC motor of several tens of Kw class used in the propeller driving motor generates a lot of heat from a stator provided therein, the efficiency of the motor may decrease and failure may occur if proper cooling and heat dissipation are not performed.

Embodiments of the present invention will be described with respect to, for example, a propeller drive of a light aircraft employing an inner rotor-outer stator type BLDC motor having a stator that generates a lot of heat in which the stator is placed outside a rotor.

In the embodiment, the rotary shaft of the propeller driving motor is horizontally arranged, but the present invention may be applied to even a case when the propeller is rotated in the horizontal direction and the rotary shaft is arranged in the vertical direction. In this case, a reducer may be coupled to the output of the motor to increase torque.

Figure 1B:
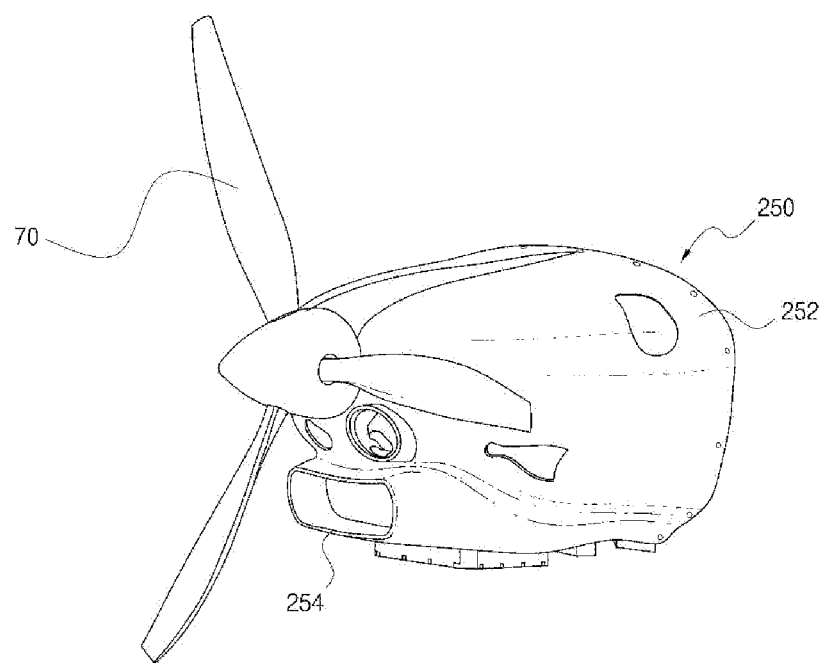
Figure 1C:
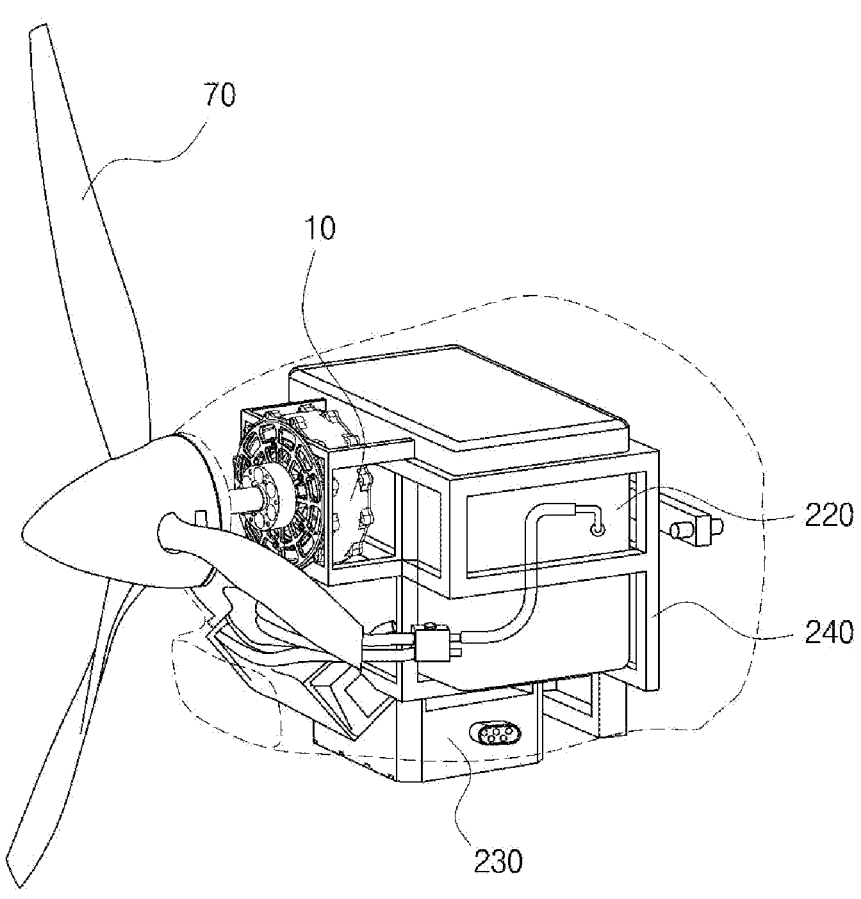

Referring to FIGS. 1A to 1C, a propeller driving motor 10 according to the present invention is installed in a front surface of a battery box 220 placed at a front end of a fuselage 210 of a light aircraft 200, and a propeller 70 is coupled to a front end of a rotary shaft to rotate the propeller 70. The rotary shaft of the propeller driving motor 10 is placed in the horizontal direction.

An inverter 230 for driving the propeller driving motor 10 is arranged under the battery box 220, and all of the inverter 230, the propeller driving motor 10, and the battery box 220 are stably supported by a support frame 240.

The battery box 220, the inverter 230, and the propeller driving motor 10 form a propeller driving motor 250, and a protective cover 252 for protecting the battery box 220, the inverter 230, and the propeller driving motor 10 therein is coupled to a front end of the fuselage 210.

A radiator hole 254 for introducing air-cooling external air into the interior when the light aircraft 200 is flying is formed below the front end of the protective cover 252, and an outlet (not shown) through which external air introduced into the protective cover 252 exits is formed at the rear end thereof.

In this case, the propeller driving motor 10 according to the present invention is not limited to the light aircraft 200, but may be applied not only to multicopter-type drones that drive multiple propellers, but also to drones that drive a single propeller.

Figure 2A:
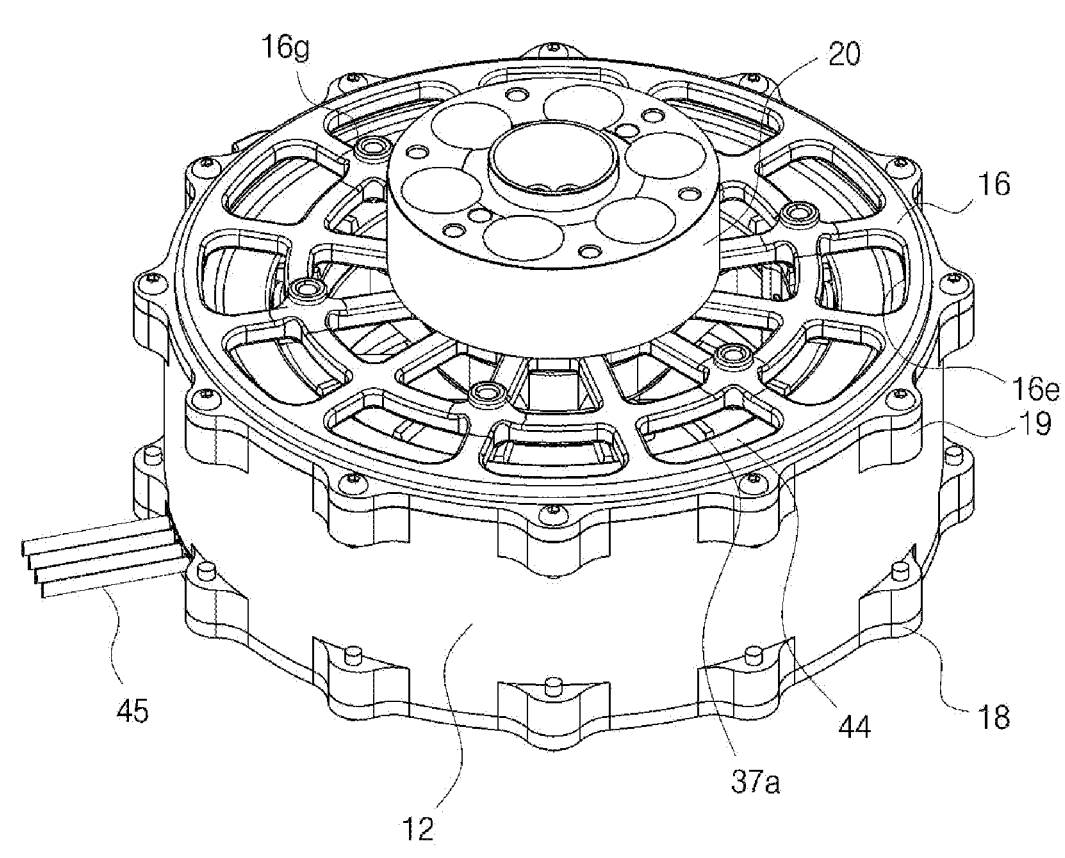
FIGS. 2A to 2D are a perspective view, a plan view, a cross-sectional view taken along line A-A of FIG. 2B, and a cross-sectional view taken along line B-B of FIG. 2B, respectively, illustrating a propeller driving motor according to the present invention.
Figure 2B:
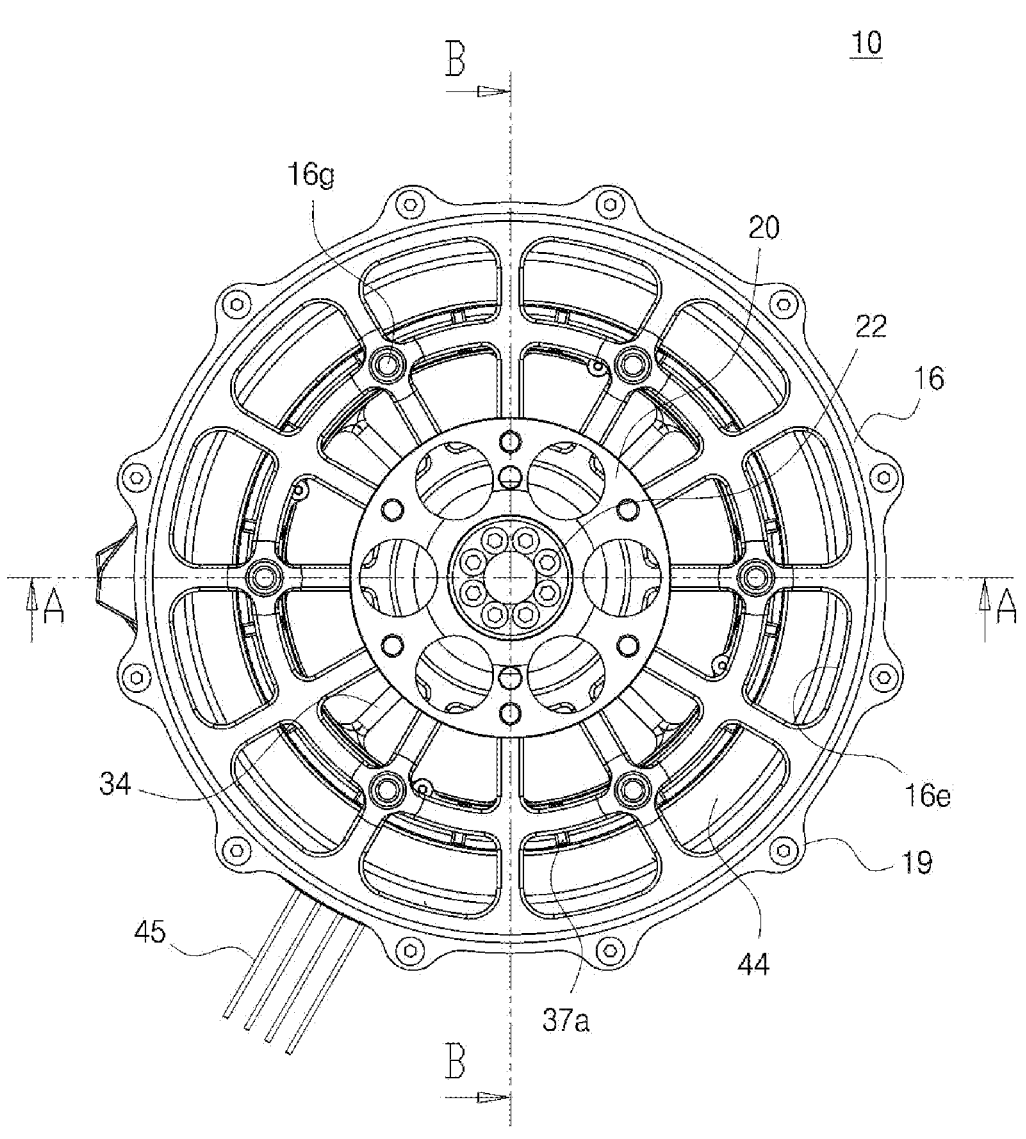
Figure 2C:
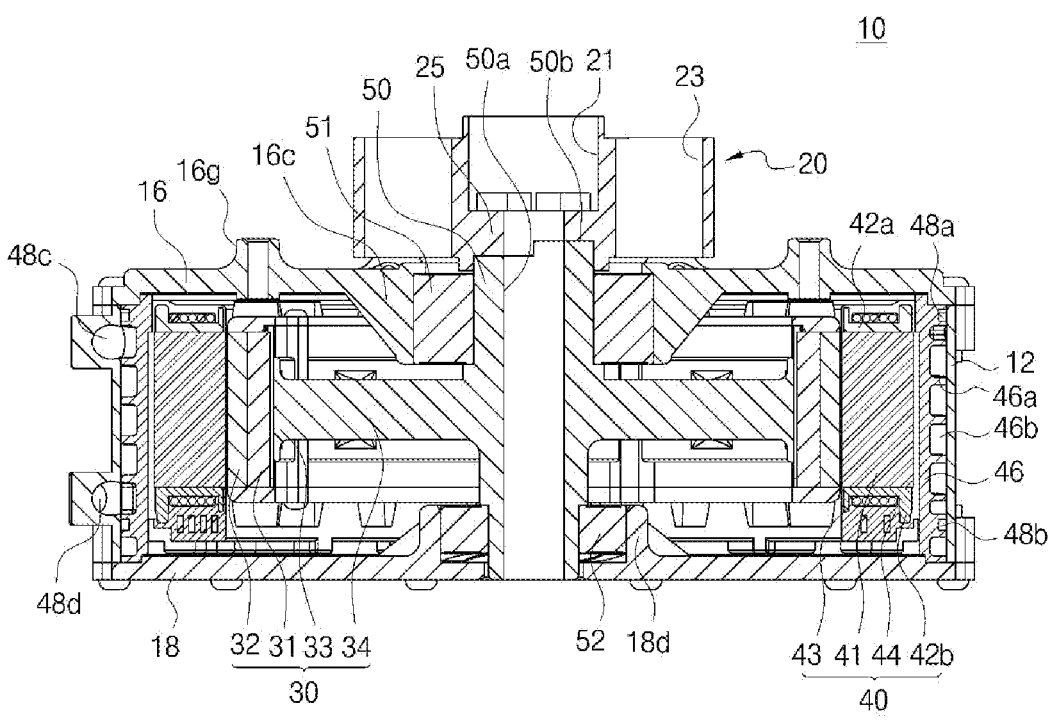
Figure 2D:
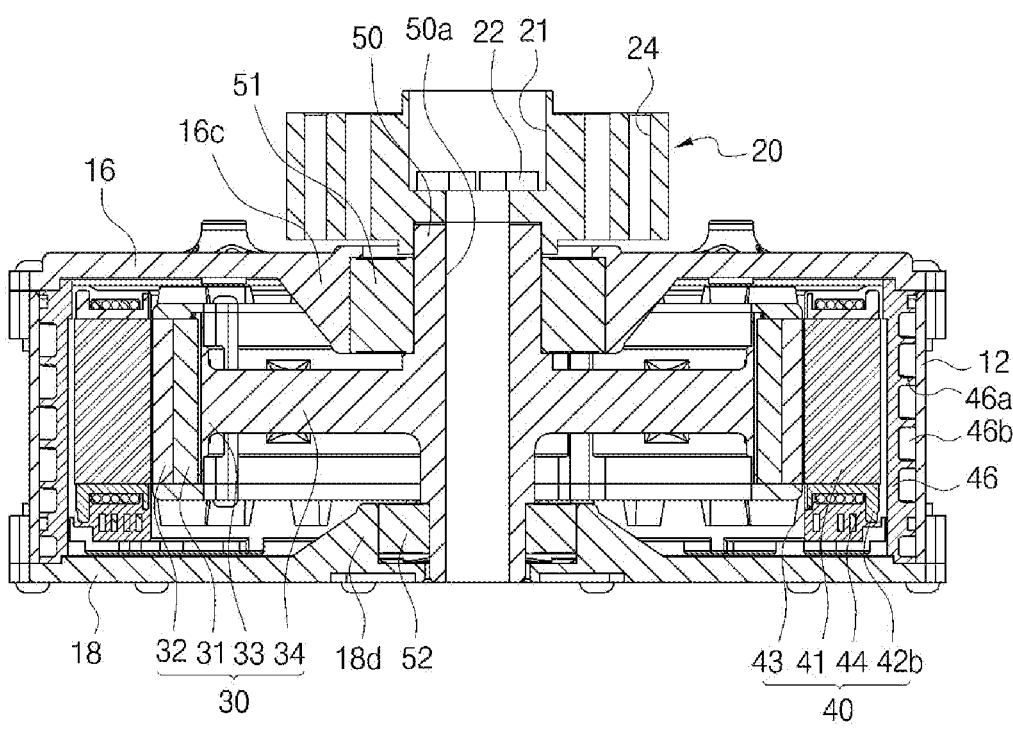
Figure 3:
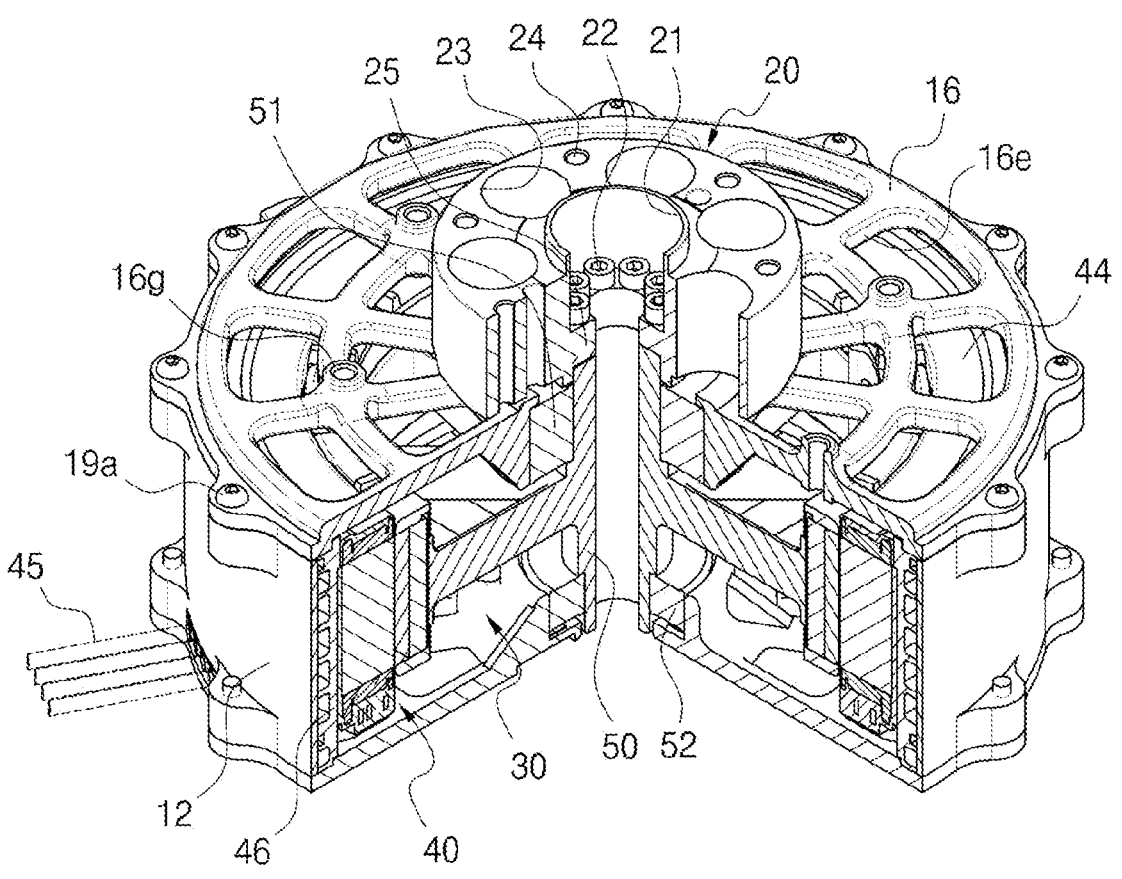
FIG. 3 is a partially cut-away perspective view of a propeller driving motor according to the present invention.

Referring to FIGS. 2A to 3, the propeller driving motor 10 according to the present invention includes a single rotor-single stator type BLDC motor 100 and a propeller installation bracket 20 for mounting the propeller 70 on a front end of the rotary shaft 50 of the motor 10.

First, the propeller installation bracket 20 is largely ring-shaped, and a large-diameter central through hole 21 is formed in a center portion of the propeller installation bracket 20. In addition, a plurality of large-diameter peripheral through holes 23 and a plurality of small-diameter peripheral through holes 24 are arranged on the same circumference as the central through hole 21 around the central through hole 21. The plurality of large-diameter peripheral through holes 23 and the plurality of small-diameter peripheral through holes 24 are arranged as a weight reduction purpose to reduce weight.

In addition, the rotary shaft 50 of the driving motor 10 has a central portion 50*a* formed in a hollow shape in order to reduce the weight of the rotary shaft 50, and the outer diameter of the central portion 50*a* is set to a size corresponding to the central through hole 21 of the propeller installation bracket 20.

An annular protrusion portion 25 is arranged on the lower side of the central through hole 21 of the propeller installation bracket 20 to be coupled to the rotary shaft 50 of the driving motor 10. In addition, the annular protrusion portion 25 has a plurality of screw fastening through holes for fastening and fixing a plurality of fixing screws 22 to the rotary shaft 50 of the driving motor 10.

An upper end portion 50*b* of the rotation shaft 50 is coupled, in a step structure, to a bottom surface of the annular protrusion portion 25 that is surface-bonded by receiving the upper end portion 50. The step structure coupling between the upper end portion 50*b* of the rotary shaft 50 and the bottom surface of the protruding portion 25 is to solve twisting generated when the propeller 70 is rotated.

The single rotor-single stator type driving motor 10 includes: a cylindrical case 12; and an upper cover 16 and a lower cover 18 respectively coupled to upper and lower portions of the cylindrical case 12. As a result, the cylindrical case 12, the upper cover 16, and the lower cover 18 serve as a housing of the driving motor 10.

A water jacket 46 for cooling the driving motor 10 by a water cooling method, a stator 40, a rotor 30, and a rotary shaft 50 are sequentially arranged inside the cylindrical case 12. Both ends of the rotary shaft 50 are rotatably supported by an upper bearing 51 and a lower bearing 52 installed in upper and lower bearing housings 16*c* and 18*c* located at the centers of the upper cover 16 and the lower cover 18, respectively.

In this case, the upper bearing 51 may adopt, for example, a double-row angular ball bearing capable of supporting radial load and one large axial load at the same time, and the lower bearing 52 may adopt a single-row angular ball bearing.

Figure 6:
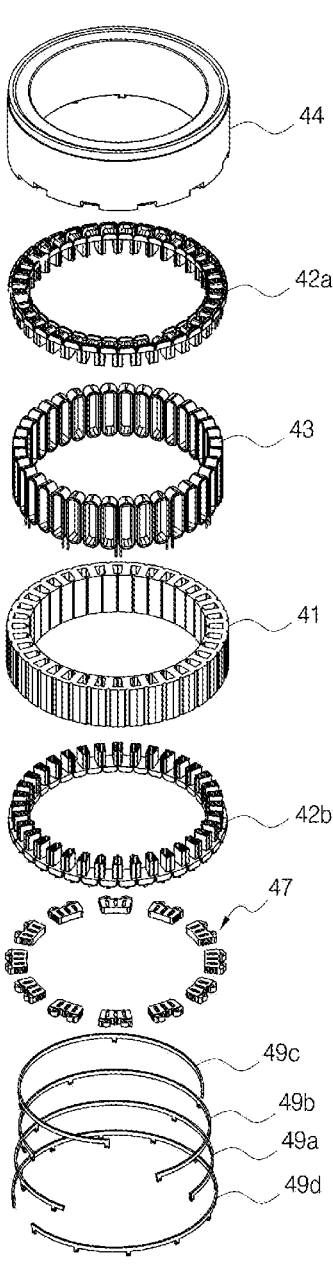
FIG. 6 is an exploded perspective view of a stator of a propeller driving motor according to the present invention.

As illustrated in FIG. 6, the water jacket 46 has spiral protrusion portions 46*a* configured to form spiral passages on an outer periphery of the cylindrical body, and the spiral protrusion portions 46*a* are in contact with the inner side surface of the cylindrical case 12. As a result, spiral passages 46*b* through which refrigerant for cooling the driving motor 10 in a water cooling method is circulated may be formed between the spiral protrusion portions 46*a*. In this case, the refrigerant may be water or an aircraft cooling oil.

In addition, as shown in FIG. 2B, an inlet 48*c* and an outlet 48*d* connected to the spiral passages 46*b* are respectively formed at the top and bottom of the cylindrical case 12, and the inlet and outlet 48*c* and 48*d* are connected to a pump (not shown) for circulating refrigerant.

Concave grooves are formed on the top and the bottom of the water jacket 46, respectively. O-rings 48*a* and 48*b* for sealing the cylindrical case 12 are inserted into the concave grooves. Therefore, leakage of the spiral passages 46*b* is prevented.

A plurality of protrusion portions each having a through hole 19 are provided in the upper cover 16 and the lower cover 18 for mutual-coupling between the cylindrical case 12 and each of the upper cover 16 and the lower cover 18, and a fixing screw 19*a* is fastened and fixed to each of the plurality of through holes 19.

A plurality of through holes 16*e* and 18*e* serving as air flow passages for air cooling are formed in the upper cover 16 and the lower cover 18, respectively. To this end, an intermediate ring 16*b* formed in a concentric shape between an upper bearing housing 16*c* serving as a hub while being positioned inside the upper cover 16 and an outer ring 16*a* arranged outside thereof, is arranged in the upper cover 16, and intermediate ring 18*b* formed in a concentric shape between a lower bearing housing 18*c* serving as a hub while being positioned inside the lower cover 18 and an outer ring 18*a* arranged outside thereof, is arranged in the lower cover 18. In addition, a plurality of bridges 16*d* and 18*d* radially extend in the upper cover 16 and the lower cover 18, to respectively connect the upper and lower bearing housings 16*c* and 18*c*, the intermediate rings 16*b* and 18*b*, and the outer rings 16*a* and 18*a*. Accordingly, a plurality of through holes 16*e* and 18*e* are formed among the upper and lower bearing housings 16*c* and 18*c*, the intermediate rings 16*b* and 18*b*, the outer rings 16*a* and 18*a*, and the plurality of bridges 16*d* and 18*d*.

The intermediate rings 16*b* and 18*b* may be omitted or added as necessary to reinforce strength, and a network structure for forming the plurality of through holes 16*e* and 18*e* formed in the upper cover 16 and the lower cover 18 may be changed variously differently.

The plurality of through holes 16*e* and 18*e* form an air flow passage for air cooling that introduces outer air at a relatively low temperature into the driving motor 10 from the outside, exchanges heat with the heat generated from the stator 40, and then discharges the exchanged heat to the outside of the motor.

The driving motor 10 according to the present invention has an inner rotor structure in which the rotor 30 is arranged inside the stator 40. In addition, the driving motor 10 constitutes a radial gap type motor in which the rotor 30 is concentrically arranged inside the stator 40.

As shown in FIGS. 2A to 5, the rotor 30 has a plurality of bridges 34 extending radially from a hollow rotary shaft 50 arranged in a central portion thereof, and a front end portion of each of the plurality of bridges 34 is connected to an annular rim 33. In addition, an annular hub 35 is reinforced to reinforce strength in the connection between each of the plurality of bridges 34 and the rotary shaft 50.

The annular rim 33 connected to the rotary shaft 50 through the plurality of bridges 34 is integrally formed, and may be made of a metal material capable of providing light weight and strength, for example, an aluminum alloy, dur-alumin, or the like.

A back yoke 31 serving as a magnetic circuit is coupled to the outer periphery of the annular rim 33 in a sliding manner. To this end, a plurality of coupling recesses 33a are formed on the outer periphery of the rim 33, and a plurality of coupling protrusions 31b coupled to the plurality of coupling recesses 33a protrude on the inner periphery of the back yoke 31.

The back yoke 31 may be made of an electrical steel sheet (silicon steel sheet) or the like to form a magnetic circuit together with a plurality of magnets 32 attached to the outer surface thereof, and a plurality of coupling protrusions 31a for attaching the plurality of magnets 32 protrude from the outer surface thereof.

The plurality of coupling protrusions 31a of the back yoke 31 support the magnets 32 while accommodating the magnets 32 in a sliding coupling manner between two adjacent coupling protrusions 31a. In this case, the shape of each of the magnets 32 is trapezoidal, and the space formed between the two coupling protrusions 31a is formed with a longer inner width so that each of the trapezoidal magnet 32 is combined. Accordingly, the coupling protrusion 31a may prevent the magnets 32 coupled between the coupling protrusions 31a from being scattered or separated.

The plurality of magnets 32 are made of permanent magnets, and a plurality of N-pole and S-pole magnets are alternately arranged.

In the rotor 30, after the plurality of magnets 32 are attached to the outer surface of the back yoke 31, upper and lower blade support plates 36a and 36b are coupled.

The upper and lower blade support plates 36a and 36b cover the upper and lower portions of the magnet 32 and the back yoke 31, respectively.

A plurality of blades 37a and 37b protrude in a radial direction on the upper and lower blade support plates 36a and 36b, respectively, to cool the stator 40 by generating wind when the rotor 30 rotates. In this case, the plurality of blades 37a and 37b may have a linear shape, a round shape, or the like.

As described above, wind generated by the plurality of blades 37a and 37b according to the rotation of the rotor 30 follows the circumferential direction, and the circumferential wind collides with the air flow passing through the plurality of through holes 16e of the upper cover 16, a plurality of spaces 33c formed between the plurality of bridges 34, and the plurality of through holes 18e formed in the lower cover 18 to generate a vortex. The vortex generated in this way reaches the corners inside the driving motor 10, so that heat exchange with the stator 40, which generates the greatest heat, may be effectively performed.

In addition, the upper and lower blade support plates 36a and 36b are provided with a protrusion part having a plurality of through-holes 36d for coupling with the rim 33, and a plurality of coupling holes 33b are formed in the rim 33 so as to be fastened by means of a fixing screw or the like.

The rotor 30 is connected between the rotary shaft 50 and the annular rim 33 through the plurality of bridges 34. As a result, the plurality of spaces 33c formed between the plurality of bridges 34 form an air flow passage for air cooling through the relatively low-temperature outside air introduced from the outside of the motor to the inside of the motor through the plurality of through holes 16e and 18e provided in the upper cover 16 and the lower cover 18.

As shown in FIGS. 2A to 4, 6, and 9F, the stator 40 includes: a split type stator core 41 in which an annular back yoke part 41a having a predetermined width to form a magnetic circuit and a plurality of split cores 410 (FIG. 9F) having a plurality of teeth 41b extending inwardly from the back yoke part 41a are assembled in an annular shape; upper and lower insulators 42a and 42b formed of an insulating material and surrounding an outer circumferential surface on which a coil of the teeth 41b is wound; and a stator coil 43 wound around outer circumferential surfaces of the upper and lower insulators 42a and 42b assembled to the plurality of teeth 41b.

Figure 9A:
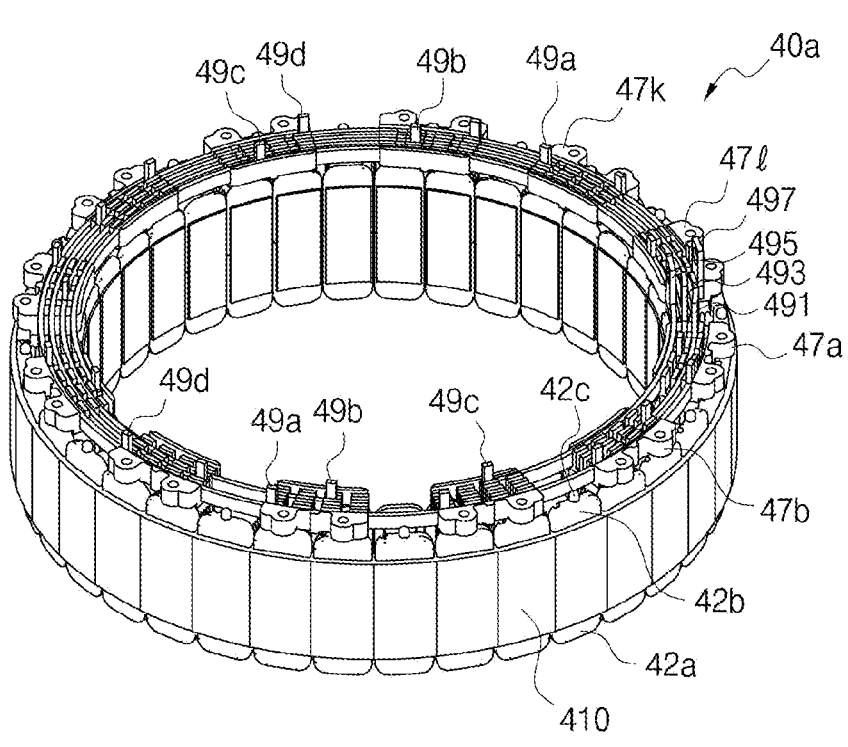
FIG. 9A is a perspective view of a state in which a stator support is removed from a stator according to the present invention.
Figure 9B:
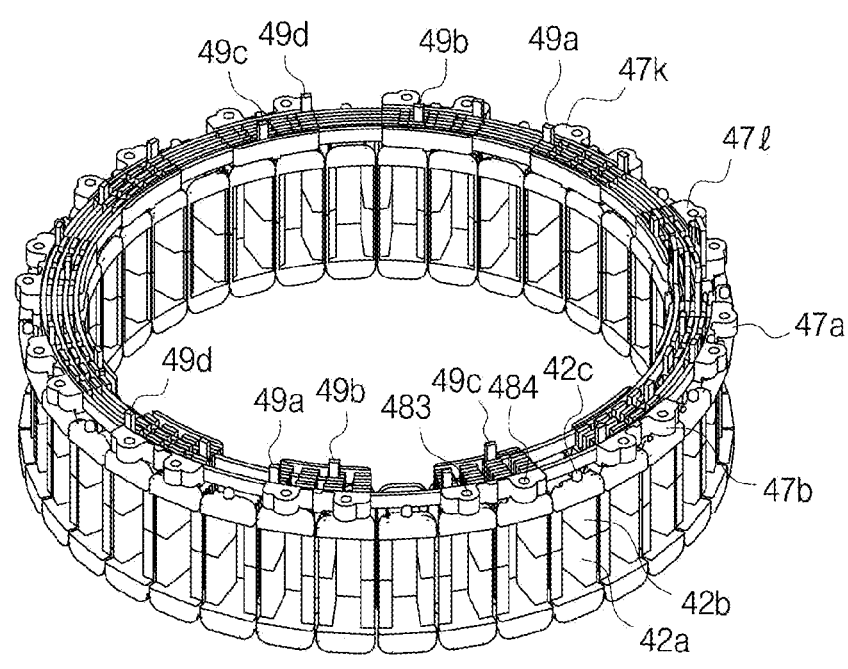
FIG. 9B is a perspective view of a state in which a split core is removed from FIG. 9A.
Figure 9C:
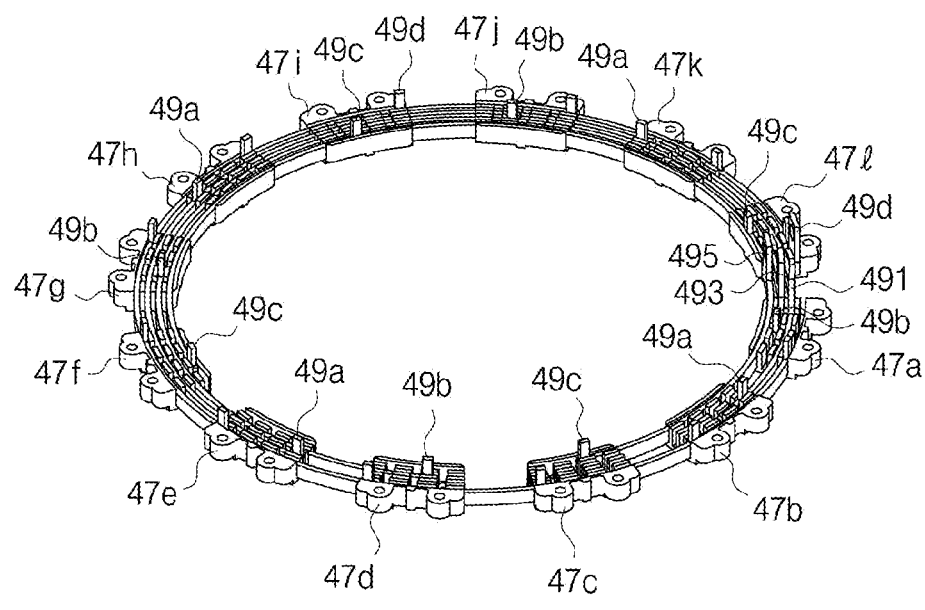
FIG. 9C is a perspective view of a state of coupling a bus bar and a bus bar bracket and in which an insulator is removed from FIG. 9B.
Figure 9D:
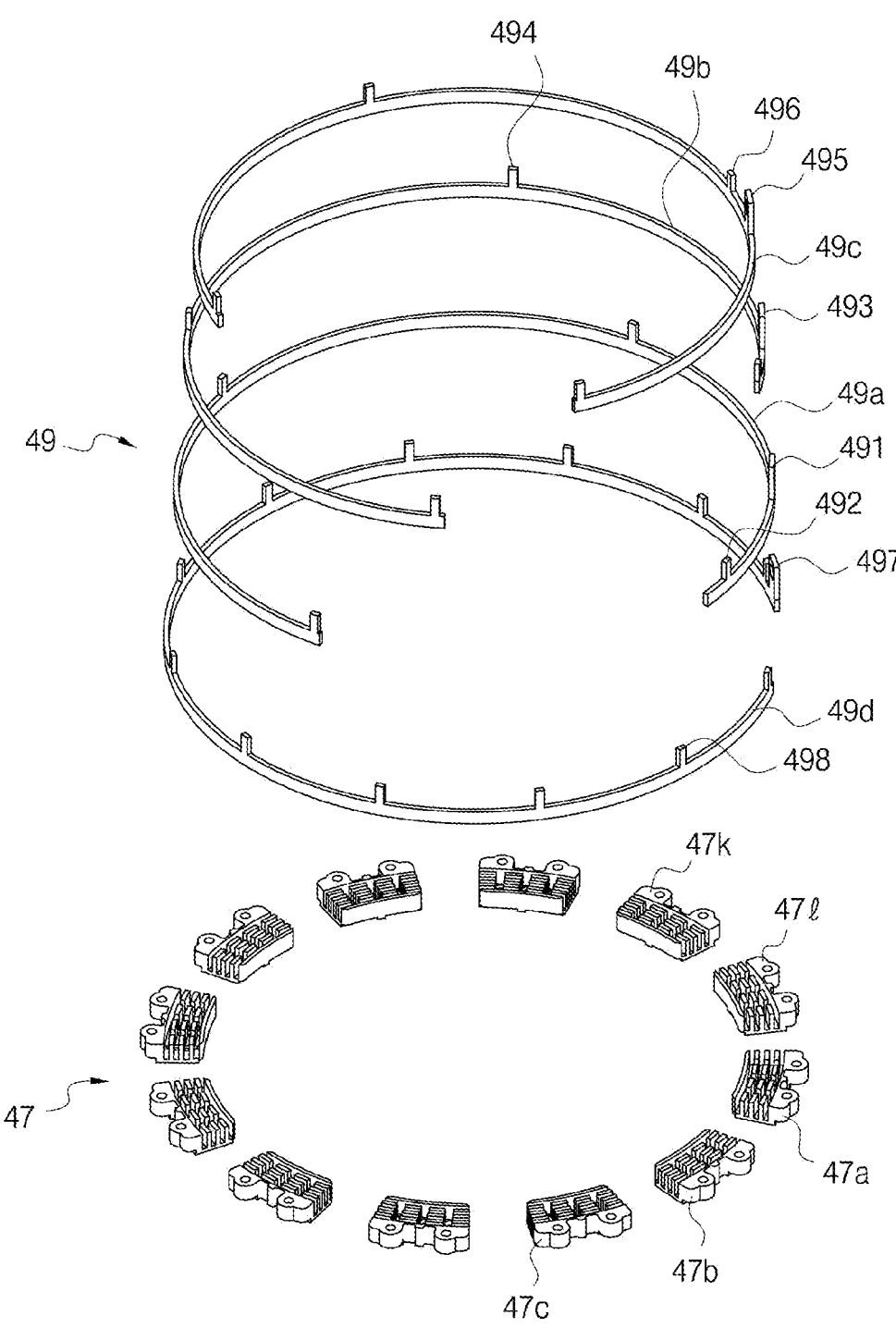
FIG. 9D is an exploded perspective view of FIG. 9C.
Figure 9E:
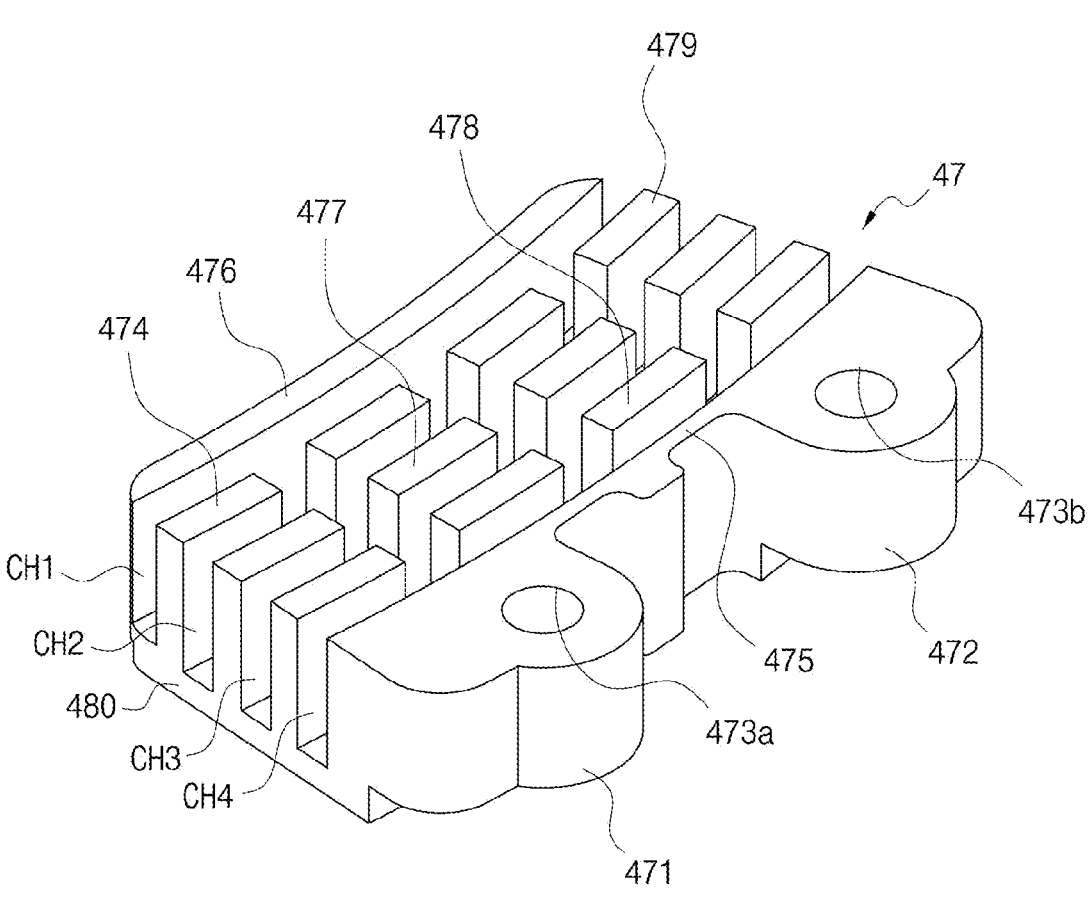
FIG. 9E is a perspective view of a bus bar bracket.
Figure 9F:
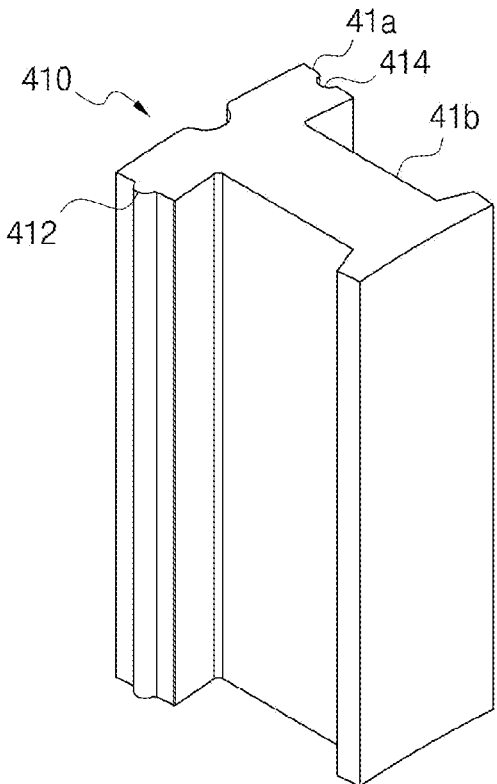
FIG. 9F is a perspective view of a split core.
Figure 9G:
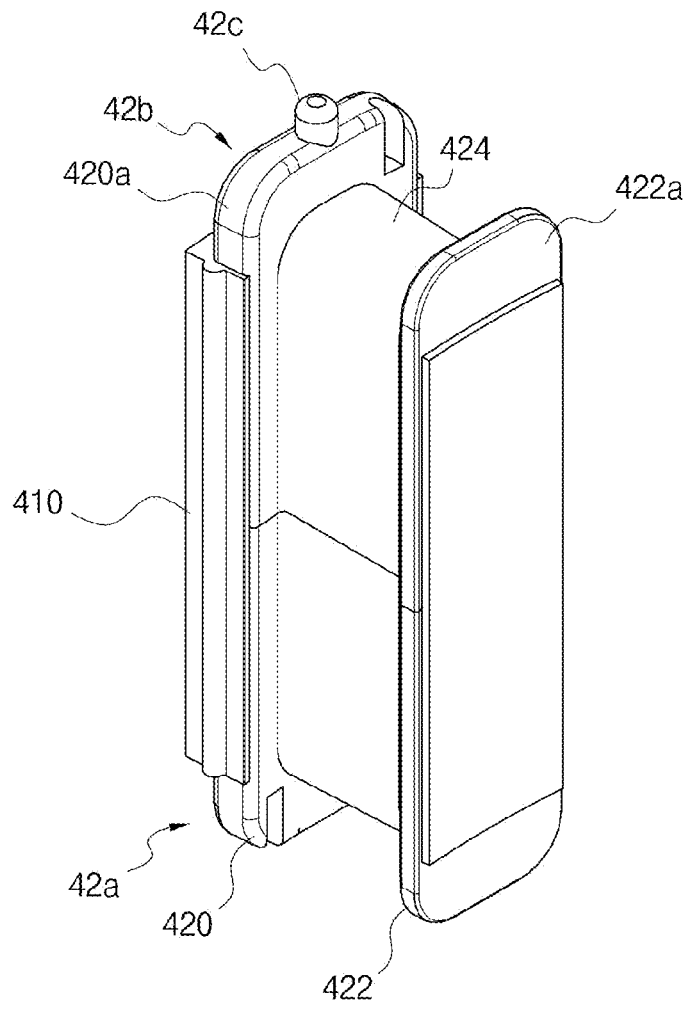
FIG. 9G is a perspective view (up and down inversion) of a split core to which an insulator is combined.

As described above, the stator 40 according to the present invention may include the split type stator core 41 in which the plurality of split cores 410 shown in FIG. 9F are assembled.

Hereinafter, the split type stator 40 having the plurality of split cores will be described with reference to FIGS. 6 to 10.

First of all, as shown in FIG. 9F, the split type stator core 41 may be configured by assembling the plurality of approximately "I" shaped split cores 410 in an annular shape so that the back yoke part 41a is interconnected in an uneven coupling structure and the teeth 41b on which the coil 43 is wound extend toward the center thereof.

The split core 410 has a coupling protrusion 412 formed on one side of the back yoke part 41a and a coupling groove 414 formed on the other side thereof, so that the back yoke parts 41a connected to each other form a path of a magnetic circuit.

The split core 410 is obtained by punching a thin-plate electrical steel sheet (silicon steel sheet) in an "I" shape, stacking a plurality of split cores of the punched thin plate at a preset thickness, and then interlocking.

In general, according to a first method, a split type stator core including a plurality of split cores is configured by integrally forming an individual bobbin for each split core using an insert molding method, winding a coil on an integrated bobbin, and then mutual-coupling the wound coil in an annular shape using a coupling structure formed on the bobbin.

Instead of the integrated bobbin, there is a second method of assembling a plurality of split cores with an upper insulator and a lower insulator integrally formed in an annular shape, and then winding a coil.

According to the first method, a coil winding may be easily performed by using a low-priced universal winding machine, but according to the second method, a coil winding is performed by using an expensive dedicated winding machine, and thus costs may be more expensive than the first method in terms of the equipment investment cost and the productivity of the coil winding.

However, the first method is less productive than the second method in that the former requires a procedure for integrally forming individual bobbins for each split core.

In this invention, instead of integrally forming individual bobbins for each split core using an insert molding method according to the first method, a coil winding is performed after individually assembling each split core 410 with upper and lower insulators 42a and 42b, and assembling in an annular shape is performed by mutual coupling in an uneven coupling structure formed on the back yoke part 41a of the split core 410.

In this case, the mutual coupling force according to the uneven coupling structure formed in the back yoke part 41*a* is not sufficient to keep a temporary assembly state firmly inside an insert molding mold when insert molding is performed with an insulating heat dissipation composite material to form the stator support 44.

In consideration of the above, in the present invention, a three-connection method is applied when a coil is wound in order to reinforce insufficient coherence according to an uneven coupling structure of back yoke parts 41*a* of split cores 410, to introduce a bus bar required for a high-power driving motor, increase the efficiency of a motor, and reduce noise and vibration generation. Hereinafter, a method of manufacturing a stator comprehensively considering these will be described.

In particular, in this invention, in order to implement a high-power driving motor, considering that the enlargement of a multi-slot/multipolar structure is required, individual upper and lower insulators 42*a* and 42*b* are assembled to the 36 split cores 410, and then 12 coil-wound core groups (i.e., one core group continuously winds the coil 43 in a three-connection manner to three split cores 410, and is referred to one set wound in the order of a forward direction, a backward direction, and a forward direction) are installed in a mold for insert molding in a temporary assembly state in an annular state. When insert molding is performed with an insulating heat dissipation composite material to form the stator support 44, the temporary assembly state is firmly maintained using the bus bar 49 and the bus bar bracket 47, thereby maintaining a predetermined position during insert molding.

Figure 8:
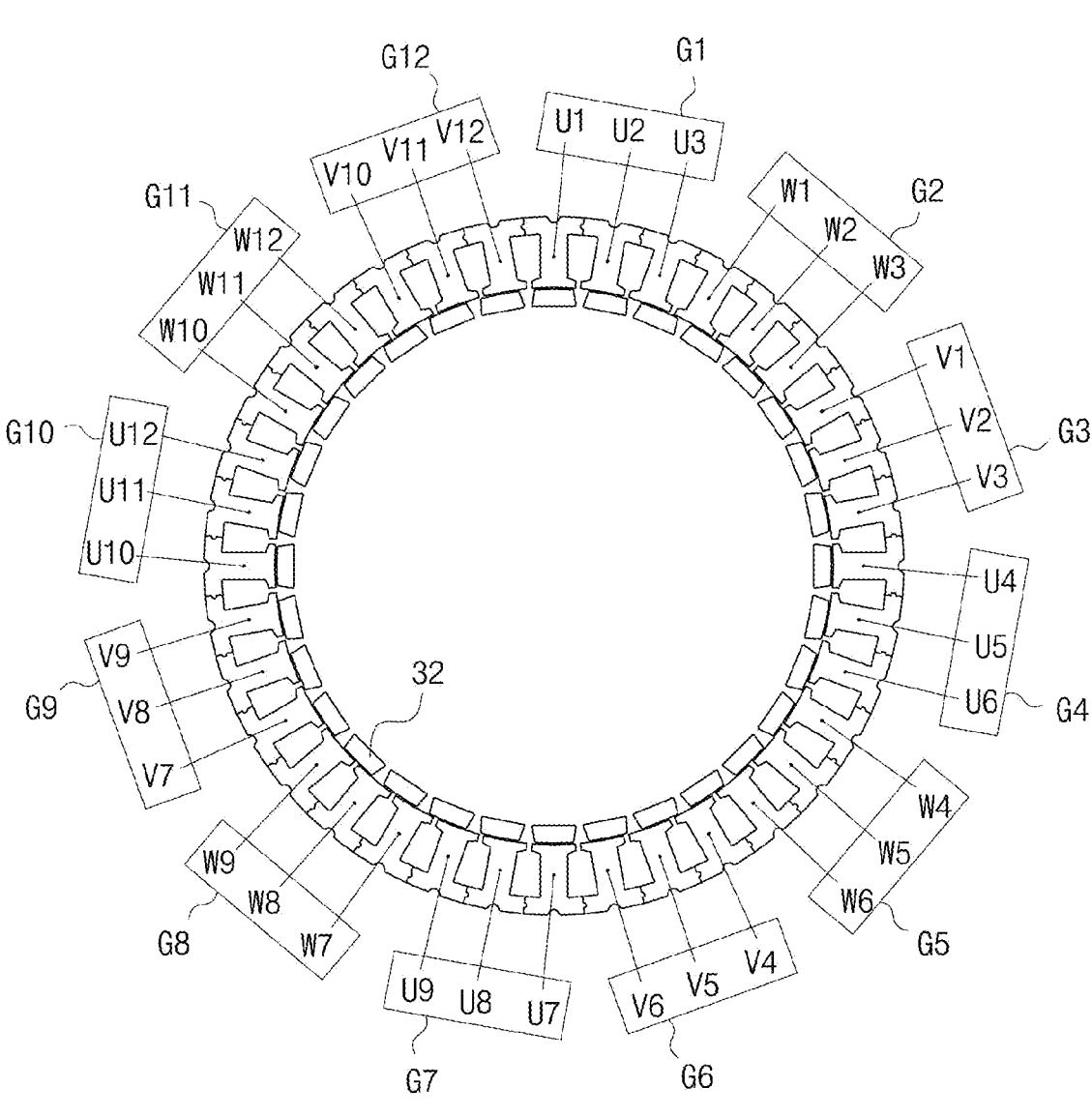
FIG. 8 is a cross-sectional view illustrating a state in which a stator core and a magnet of a rotor of a propeller driving motor are arranged to face each other according to the present invention.

The propeller driving motor according to the present invention may include, for example, a BLDC motor having an outer stator of 36 slots and an inner rotor of 32 poles as shown in FIG. 8.

The stator 40 includes 36 split cores 410 forming 36 slots, and the rotor 30 includes 32 magnets 32.

Hereinafter, a method of winding a stator coil and an equivalent circuit of the stator coil will be described with reference to FIGS. 7A and 7B.

The winding of the stator coil is performed in a three-connection method in which the coil 43 is continuously wound in the forward, reverse, and forward order in succession to the three split cores 410. The thus-wound three split cores 410 form a set and are referred to as a core group.

As a result, the 36 split cores 410 are divided into 12 core groups G1 to G12 by winding the coil in a three-connection method, and in the case of a U, V, and W three-phase driving method, four core groups are allocated for each phase.

Figure 7A:
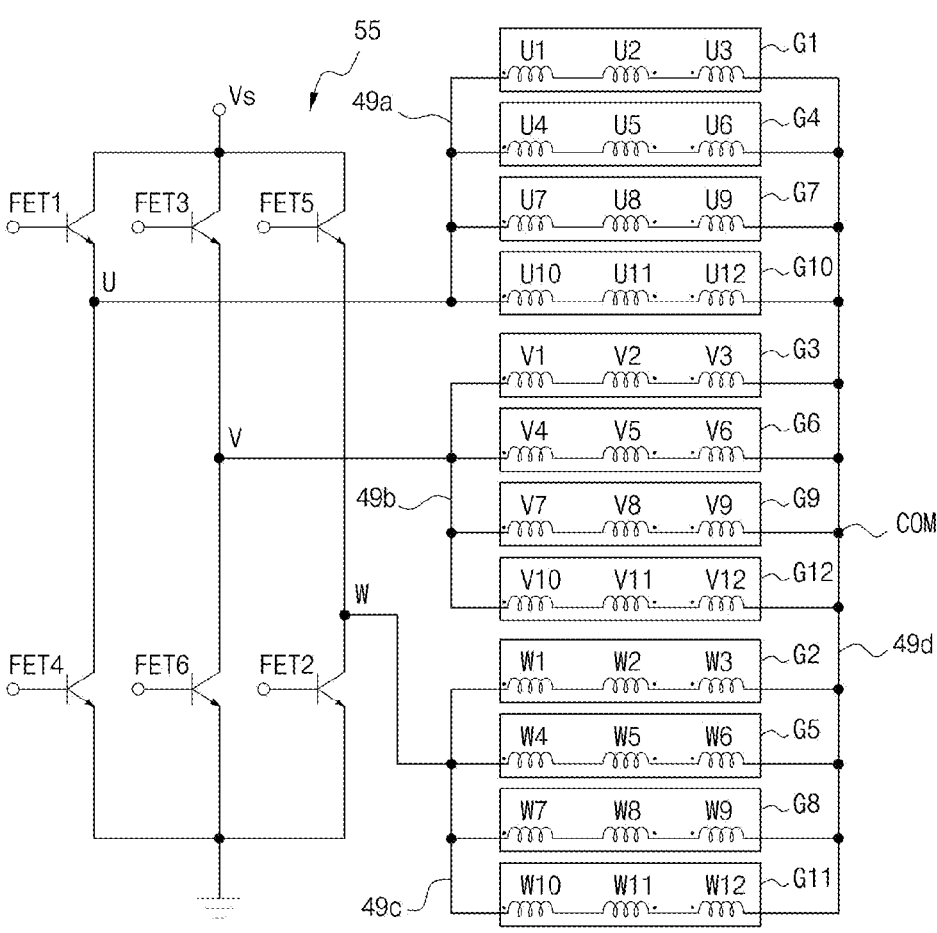
FIG. 7A is a circuit diagram showing an equivalent circuit and a motor driving circuit of a stator coil wound according to a three-connection method according to the present invention.

As illustrated in FIG. 7A, the four core groups allocated for each phase are connected in parallel between the respective core groups during winding the coil in a three-connection method to reduce coil temperature and increase efficiency by reducing resistance and coil loss by minimizing coil resistance.

As a result, when the three-phase U, V, and W coils U1-U12, V1-V12, and W1-W12 of the stator 40 are connected by a Y-connection method, respective start terminals of the core groups G1, G4, G7, and G10 allocated to the U phase, the core groups G3, G6, G9, and G12) allocated to the V phase, and the core groups G2, G5, G8, and G11 allocated to the W phase are connected in common to the three-phase outputs U, V, and W of the inverter circuit 55 provided in the motor driving circuit, respectively, and the end terminals are all connected to a common electrode COM to form a neutral point.

In the following description, U1-U12, V1-V12, and W1-W12 refer to coils allocated to each phase for convenience and also to split cores on which the coils are wound.

Figure 7B:
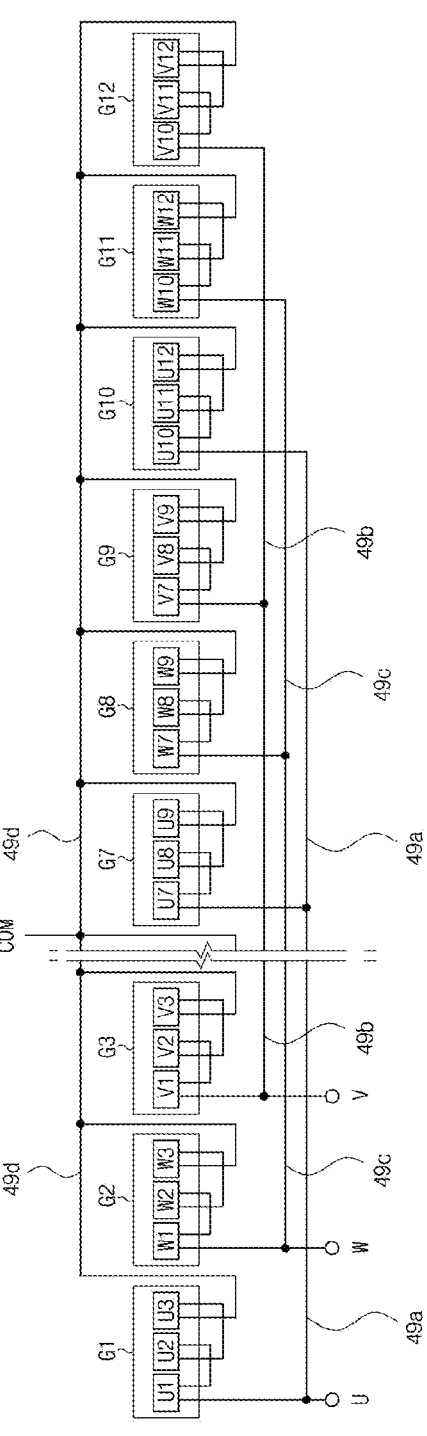
FIG. 7B is an explanatory diagram showing an arrangement state for configuring a circuit in a parallel connection method of four core groups for each phase according to the present invention and temporarily assembling 12 coil-wound core groups in an annular shape.

As illustrated in FIG. 7B, the three-phase output (U, V, W) of the inverter circuit 55 and a connector 45*a* of the stator 40 of the propeller driving motor 10 are connected through a cable 45, and U-phase, V-phase, and W-phase bus bars 49*a* to 49*c* are respectively arranged between the connector 45*a* and each of the start terminals of the core groups G1, G4, G7, and G10 allocated on the U phase of the three-phase stator coil 43, the core groups G3, G6, G9, and G12 allocated on the V phase thereof, and the core groups G2, G5, G8, and G11 allocated to the W phase, and the end terminals of the core groups G1 to G12 are all connected to the common electrode bus bar 49*d*.

As described above, the inputs and outputs of the core groups: G1, G4, G7, and G10; G3, G6, G9, and G12; G2, G5, G8, and G11 allocated on the U-phase, V-phase, and W-phase are commonly connected to each other to form a parallel connection circuit.

As illustrated in FIGS. 7B and 8, in the respective core groups G1 to G12, the core groups: G1, G4, G7, and G10; G3, G6, G9, and G12; and G2, G5, G8, and G11 respectively allocated to the U-phase, V-phase, and W-phase are alternately arranged in an annular shape. In this case, in the respective core groups G1 to G12, the core groups: G1, G4, G7, and G10; G2, G5, G8, and G11; and G3, G6, G9, and G12 respectively allocated to the U-phase, W-phase, and V-phase, may be alternately arranged in an annular shape.

When the core groups: G1, G4, G7, and G10; G3, G6, G9, and G12; and G2, G5, G8, and G11 respectively allocated to the U-phase, V-phase, and W-phase are alternately arranged in an annular shape for each phase, The first core group G1 and the seventh core group G7, the fourth core group G4 and the tenth core group G10 on the U phase are respectively arranged at positions facing each other based on the center of the stator core 41. The fourth core group G4 and the tenth core group G10 on the U phase are respectively arranged at positions facing each other based on the center of the stator core 41.

Similarly, the two core groups of the core groups: G3, G6, G9, and G12; and G2, G5, G8, and G11 respectively allocated on the V and W phases are also respectively arranged at positions facing each other based on the center of the stator core 41.

If the state has 27 slots, which is a multiple of 9, nine coils U1-U9, V1-V9, and W1-W9 are included in each phase, and are continuously wound on the adjacent three split cores, to form nine core groups G1 to G9.

As described above, when the core groups G1 to G12 are arranged for each phase, the U-phase, V-phase, and W-phase bus bars 49*a* to 49*c* include output terminal terminals 491, 493, and 495 with through holes so that the leading ends of the three cables 45 are firmly connected, respectively, and four connection terminals 492, 494, and 496 protruded so as to be connected to the start terminals of the core groups: G1, G4, G7, and G10; G3, G6, G9, and G12; and G2, G5, G8, and G11 respectively allocated to the U-phase, V-phase, and W-phase, respectively, and the common electrode bus bar 49*d* to which 12 end terminals of the core groups G1 to G12 includes a common electrode output terminal 497 protruded so as to have 12 connection terminals 498 and one through hole.

In this case, the output terminal terminals 491, 493, and 495 of the U-phase, V-phase, and W-phase bus bars 49*a* to 49*c* are arranged adjacent to one of the four connection terminals 492, 494, and 496, respectively, and the output terminal 497 for the common electrode of the common electrode bus bar 49*d* is also arranged adjacent to one of the 12 connection terminals 498.

Four connection terminals 492, 494, and 496 for each U-phase, V-phase, and W-phase bus bars 49*a* to 49*c*, and 12 connection terminals 498 of the common electrode bus bar 49*d* are arranged at intervals and are arranged close to the start terminals and the end terminals of each of the core groups: G1, G4, G7, and G10; G3, G6, G9, and G12; and G2, G5, G8, and G11 which are arranged in an annular form, thereby minimizing unnecessary coil length, and minimizing the resistance of the coil to thus reduce the resistance and coil loss.

FIGS. 9A to 9C are inversely illustrated such that a lower portion of the stator 40 is positioned at an upper side for convenience of description.

Figure 10:
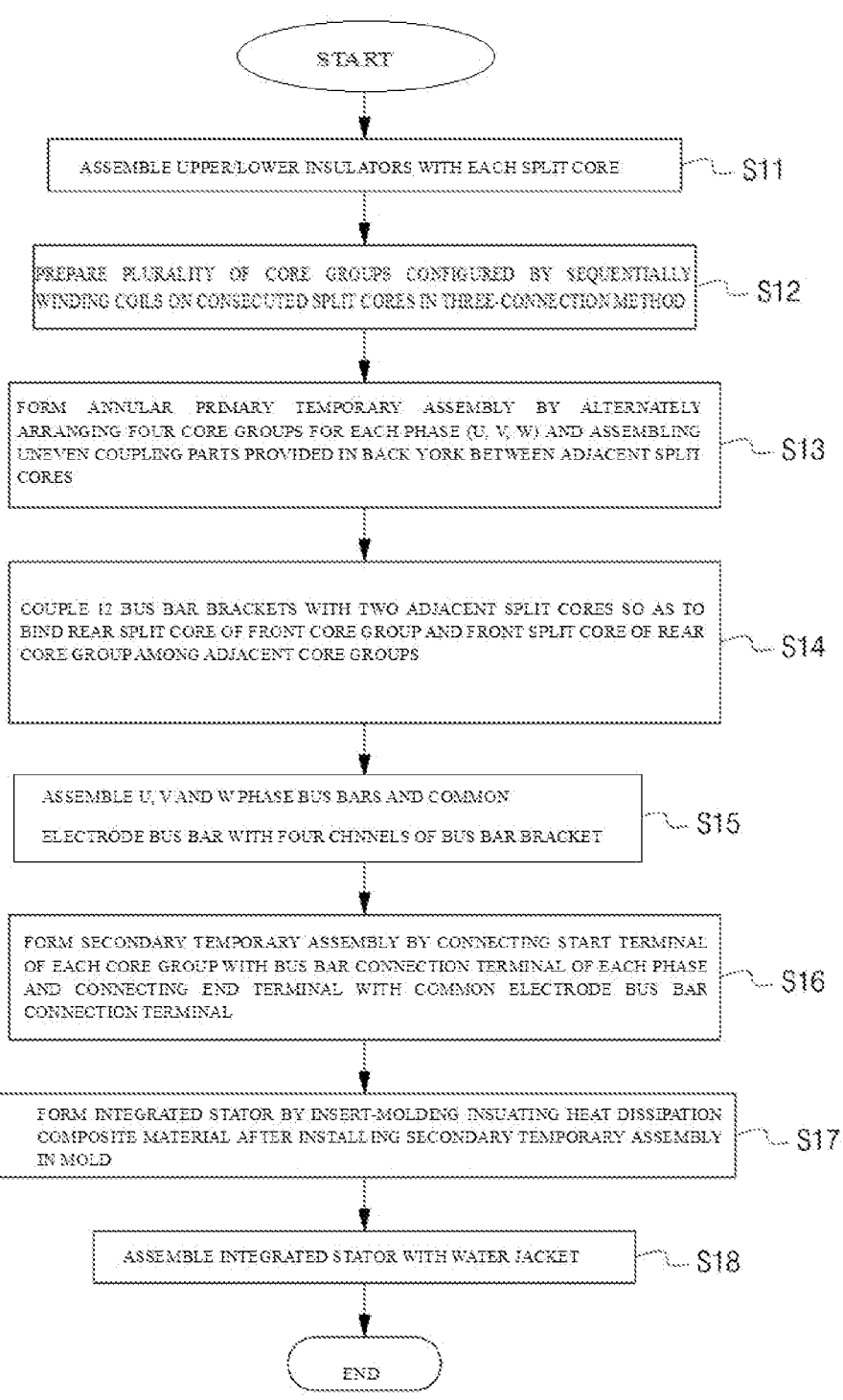
FIG. 10 is a flowchart illustrating a method of manufacturing a split core type stator according to the present invention.

Hereinafter, a method of manufacturing a stator according to the present invention will be described with reference to FIGS. 9A to 10.

First, when the stator includes 36 split cores 410, upper and lower insulators 42*a* and 42*b* are assembled to each split core 410, for example (S11). In this case, the upper and lower insulators 42*a* and 42*b* are placed inside the "T"-shaped dividing core 410 and have a hollow shape surrounding the teeth 41*b* on which the coil 43 is wound, except for a shoe portion facing a magnet and the back yoke part 41*a* located outside.

Each of the upper and lower insulators 42*a* and 42*b* includes a pair of flanges: 420 and 422; and 420*a* and 422*a* respectively protruding inward and outward, and a coil winding region 424 formed between the pair of flanges: 420 and 422; and 420*a* and 422*a* and having a hollow portion surrounding the teeth 41*b* on which the coil 43 is wound, and a coupling protrusion 42*c* required to be coupled and fixed to the bus bar bracket 47 protrudes from the outer flange 420*a* of the lower insulator 42*b*.

Thereafter, 12 core groups G1 to G12 are prepared by continuously winding the coil 43 around the three split cores 410 in a three-connection method (S12). The three-connection method is to wind the wire in the three consecutive split cores 410 in the forward, reverse, and forward directions, and as a result, as will be described later, each of the three split cores inside each core group forms an electromagnet, and when current flows through the coil, magnetic fluxes are generated in opposite directions.

Subsequently, four core groups: G1, G4, G7, and G10; G3, G6, G9, and G12; and G2, G5, G8, and G11 are alternately arranged for each phase of U, V, and W, and the coupling protrusion 412 provided in the back yoke part 41*a* and the uneven coupling part of the coupling groove 414 are assembled between the adjacent split cores 410, to form an annular primary temporary assembly (S13).

Thereafter, as shown in FIG. 9B, 12 bus bar brackets 47*a* to 47*l* are combined with two adjacent lower insulators 42*b* (i.e., split cores) to bind the rear split core of the front core group and the front split core of the rear core group among the adjacent core groups (S14).

Although the embodiment illustrates that the plurality of bus bar brackets 47*a* to 47*l* are coupled to the lower insulators 42*b*, a coupling protrusion required for coupling and fixing the bus bar bracket 47 to the flange of the upper insulator 42*a* may be provided, and the plurality of bus bar brackets 47*a* to 47*l* may be coupled to the upper insulator 42*a*.

As shown in FIG. 9E, each of the bus bar brackets 47*a* to 47*l* includes: a rectangular base part 480; an inner wall 474 and an outer wall 475 protruding from the inner and outer circumferences of the base part 480; three-row guide protrusions 476 to 479 protruding to form four guide channels CH1 to CH4 in which U-phase, V-phase, and W-phase bus bars 49*a* to 49*c* and the common electrode bus bar 49*d* are coupled and fixed between the inner wall 474 and the outer wall 475; and a pair of protrusions 471 and 472 protruding from both ends of the outer wall 475 and having respective coupling holes 473*a* and 473*b* formed to be coupled to the coupling protrusions 42*c* of the lower insulator 42*b*.

The respective coupling protrusions 42*c* of two adjacent lower insulators 42*b* are inserted into coupling holes 473*a* and 473*b* of each of the bus bar brackets 47*a* to 47*l* so as to be coupled, and as a result, 12 lower insulators 42*b* that are not coupled to the bus bar brackets 47*a* to 47*l* are present one by one between two adjacent lower insulators 42*b*.

Subsequently, the W-phase, V-phase, and U-phase bus bars 49*c*, 49*b*, and 49*a* are assembled to the guide channels CH1 to CH3 of each of the bus bar brackets 47*a* to 47*l* in the outer guide channel direction from the inner guide channel, and the common electrode bus bar 49*d* is assembled to the outermost channel CH4 (S15).

The twelve connection terminals 498 protrude from the common electrode bus bar 49*d*, the twelve connection terminals 498 of the common electrode bus bar 49*d* are arranged one by one at the outermost channel CH4 of each of the twelve bus bar brackets 47*a* to 47*l*, and one of the connection terminals 492, 494, and 496 of the W-phase, V-phase, and U-phase bus bars 49*c*, 49*b*, and 49*a* is arranged in each of the twelve bus bar brackets 47*a* to 47*l*.

The W-phase, V-phase, and U-phase bus bars 49*c*, 49*b*, and 49*a* in which a connection terminal of (core group number/3) protrudes from each of four guide channels CH1 to CH4 formed in each of the bus bar brackets 47*a* to 47*l*, and the common electrode bus bar 49*d* protruded to have the same twelve connection terminals as twelve core groups are assembled.

As a result, one of the four connection terminals 492, 494, and 496 of the W-phase, V-phase, and U-phase bus bars 49*c*, 49*b*, and 49*a* and one of the twelve connection terminals 498 of the common electrode bus bars 49*d* are arranged on the twelve bus bar brackets 47*a* to 47*l*, respectively.

In this case, each of the three-row guide protrusions 476 to 479 is divided into four-row division protrusions. The four connection terminals 492, 494, and 496 and the output terminal terminals 491, 493, and 495 of the U-phase, V-phase, and W-phase bus bars 49*a* to 49*c*, and twelve connection terminals 498 and the common electrode output terminal 497 of the common electrode bus bar 49*d*, are aligned and arranged on one of the three rows and four columns of split protrusions with a certain rule.

That is, the 12 connection terminals 498 of the common electrode bus bar 49*d* and the common electrode output terminal 497 are placed on the outermost channel CH4 of the bus bar brackets 47*a* to 47*l*, respectively, and aligned with a first row split protrusion at the leftmost side. Each of the four connection terminals 492 of the U-phase bus bar 49*a* is arranged on the guide channel CH3 and aligned with a fourth row split protrusion at the rightmost side. Each of the four connection terminals 494 of the V-phase bus bar 49*b* is arranged on the guide channel CH2 and aligned with a second row split protrusion. Each of the four connection terminals 496 of the W-phase bus bar 49*c* is arranged in the guide channel CH1 and is arranged to be aligned with a third row split protrusion.

Subsequently, the start terminals of each of the core groups G1 to G12 are connected to the connection terminals 492, 494, and 496 of the bus bars 49*a* to 49*c* in each phase, and the end terminal is connected to the connection terminal 498 of the common electrode bus bar 49*d* to form a secondary temporary assembly 40*a* as shown in FIG. 9A (S16).

When the start terminals of each of the core groups G1 to G12 are connected to the connection terminals 492, 494, and 496, an electrical/physically stable connection may be achieved while an insulating coating film coated on a wire is removed if winding is performed and soldering is performed at least once by a wire wrapping method.

As described above, one of the connection terminals 492, 494, and 496 of the W-phase, V-phase, and U-phase bus bars 49*c*, 49*b*, and 49*a* and one of the 12 connection terminals 498 of the common electrode bus bar 49*d* are aligned and arranged on one of the three rows and four rows of split protrusions for each of the bus bar brackets 47*a* to 47*l* with a certain rule. As a result, the start terminals and end terminals generated for each of the 12 core groups G1 to G12 dispersed in an annular shape are entirely distributed and connected to the connection terminals 492, 494, 496, and 498 of the three-phase bus bars 49*a* to 49*c* and the common electrode bus bar 49*d*, thereby eliminating the possibility of misassembly and increasing assembly productivity.

In the core groups G1 to G12, a start terminal and an end terminal are generated by continuously winding a coil to each of the three consecutive split cores 410, and the three-phase coil may easily form a parallel connection circuit by connecting the start terminal with the end terminal as shown in FIGS. 7A and 7B.

In addition, the output terminal terminals 491, 493, and 495 of the U-phase, V-phase, and W-phase bus bars 49*a* to 49*c* and the common electrode output terminal 497 of the common electrode bus bar 49*d* are larger than the connection terminals 492, 494, 496, and 498, each with one through hole. The output terminal terminals 491, 493, and 495 of the U-phase, V-phase, and W-phase bus bars 49*a* to 49*c* and the common electrode output terminal 497 of the common electrode bus bar 49*d* are interconnected with the connector 45*a* connected to the cable 45 at one side using a through hole.

The secondary temporary assembly 40*a* obtained as described above is then installed inside the mold for insert molding, and then insert-molded with an insulating heat dissipation composite material to be described later to form a stator support 44 integrated with the secondary temporary assembly 40*a* to thereby obtain an integrated stator 40 (S17).

Then, the obtained integrated stator 40 is assembled to the water jacket 46 prepared in advance (S18).

Figure 4:
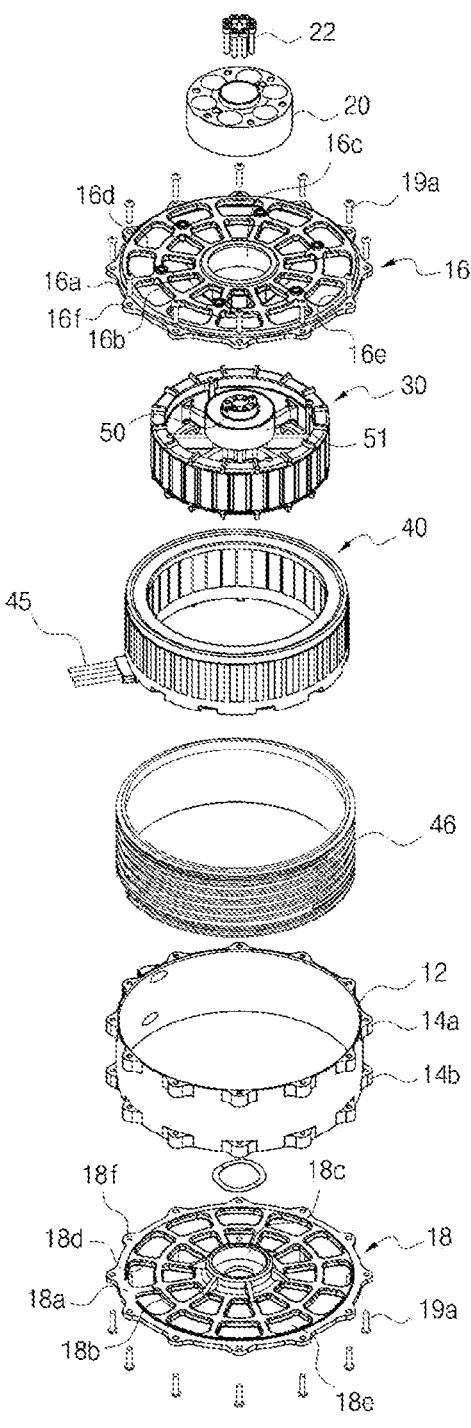
FIG. 4 is an exploded perspective view of a propeller driving motor according to the present invention.
Figure 5:
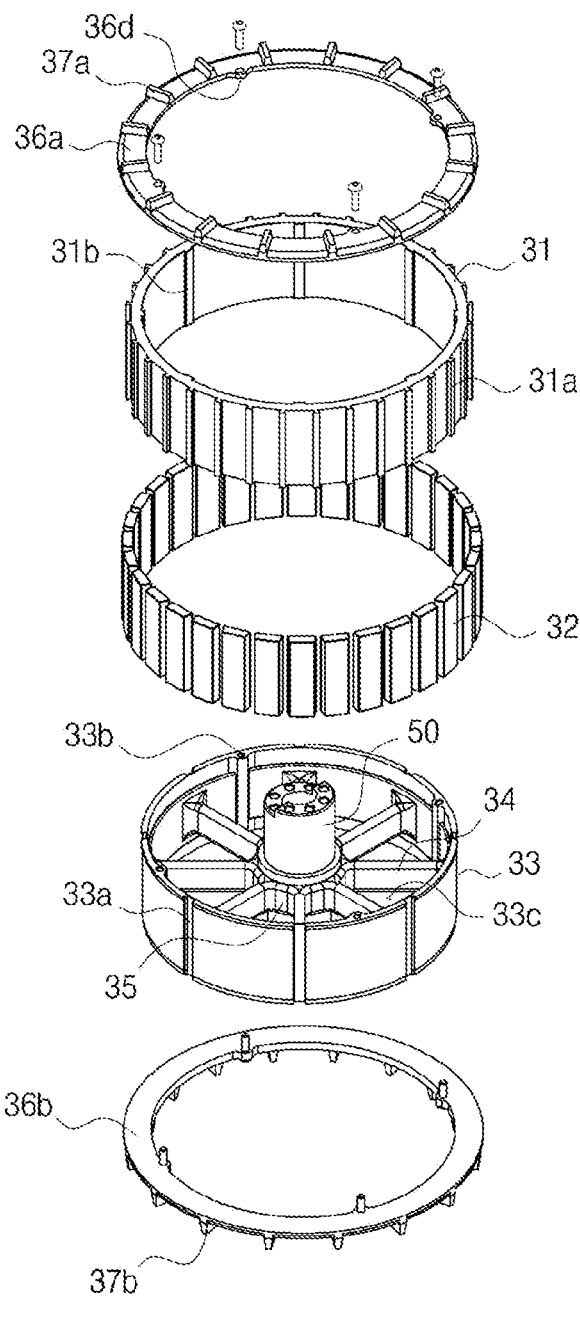
FIG. 5 is an exploded perspective view of a rotor of a propeller driving motor according to the present invention.

The stator support 44 has a heat dissipation characteristic that surrounds the stator coil 43 wound around the plurality of insulators 42*a* and 42*b* and integrates the secondary temporary assembly 40*a* as shown in FIG. 4, and is inserted between the coils wound around the adjacent split core 410 to insulate between the coil and the coil and transfer heat generated from the coil to the water jacket 46 closely coupled to the outside.

In the embodiment described above, a method of assembling, to the water jacket 46, the integrated stator 40 obtained by integrally forming the stator support 44 on the secondary temporary assembly 40*a* was presented. Instead, the stator support 44 may integrate the secondary temporary assembly 40*a* with the water jacket 46 by installing the secondary temporary assembly 40*a* inside the water jacket 46 and then insert molding the same with an insulating heat dissipation composite material to form the stator support 44.

As described above, when the stator support 44 is integrally formed with the secondary temporary assembly 40*a* and the water jacket 46, heat generated from the stator coil 43 may be quickly transferred to the water jacket 46 through the stator support 44.

In the propeller driving motor 10 according to the present invention, the inputs and outputs of the four core groups: G1, G4, G7, and G10; G3, G6, G9, and G12; and G2, G5, G8, and G11 allocated on the U-phase, V-phase, and W-phase are commonly connected to form a parallel connection circuit, thereby minimizing the resistance of the stator coil 43.

In general, the resistance R is proportional to the length 1 and inversely proportional to the cross-sectional area S. Accordingly, the total resistance of the stator coils 143 having parallel connection between the respective core groups is reduced by about ½ compared to the serial connection structure. As a result, copper loss (coil loss) is a phenomenon caused by the generation of energy of $(P=I^2R)$ as heat when current I flows through a conductor of resistance RΩ, and energy loss causes a temperature rise.

As a result, in the present invention, as the resistance of the stator coil 43 decreases, resistance and coil loss may be reduced to lower the coil temperature and increase efficiency. Also, since the resistance of the stator coil 43 may be lowered, a power rise may be promoted in the propeller driving motor requiring instantaneous power.

When the propeller driving motor 10 of the present invention has a 36-slot 32-pole structure, the three-phase (U, V, W) coil 43 includes 12 coils U1-U12, W1-W12, and V1-V12 for each U, V, and W phase as shown in FIG. 7A. The coils U1-U12, W1-W12, and V1-V12 of each U, V, and W phase are continuously wound on three adjacent teeth to form one core group, forming 12 first to twelfth core groups G1 to G12 as a whole.

Further, in the stator 40 of the present invention, the three-phase (U, V, and W) coils U1-U6, W1-W6, and V1-V6 are connected in a Y-connection manner. In the U, V, and W coils U1-U12, W1-W12, and V1-V12, one side (start terminal) of each phase is connected to the U, V, and W outputs of the inverter circuit 55 constituting the motor driving circuit through U-phase, V-phase, and W-phase bus bars 49*a* to 49*c* as shown in FIGS. 7A and 7B, and the other sides (end terminals) of each phase are commonly connected to each other to form a neutral point (NP).

In this case, the three-phase (U, V, and W) coils U1-U12, W1-W12, and V1-V12 are connected, in the Y-connection method, to the common electrode bus bar 49*d* for forming the neutral point (NP).

Hereinafter, an operation of the propeller driving motor 10 according to the present invention will be described with reference to FIGS. 7A to 8.

The propeller driving motor 10 according to the present invention has a 36-slot and 32-pole structure, for example, as shown in FIG. 8, and the three-phase (U, V, W) coils 43 include 12 coils U1-U12, W1-W12, and V1-V12 for each U, V, and W phase, as shown in FIG. 7A. In addition, the coils U1-U12, W1-W12, and V1-V12 of each U, V, and W phase are continuously wound around three adjacent teeth to form one core group, thereby forming 12 first to twelfth core groups G1 to G12 as a whole.

The twelve first to twelfth core groups G1 to G12 are alternately arranged in an annular shape for each phase of U, V, and W, as shown in FIGS. 7B and 8. In the present invention, instead of arranging the three winding coils in the order of the U-phase core group, the W-phase core group, and the V-phase core group, it is also possible to arrange the three winding coils in the order of the U-phase core group, the V-phase core group, and the W-phase core group.

In the present invention, the arrangement of the core groups is required to satisfy a condition in which the corresponding core groups of each phase are arranged symmetrically at positions opposite to each other around a rotation axis.

The driving of the propeller driving motor 10 may be performed in one of a 120 degree conduction control method using a plurality of Hall elements, a sinusoidal control or vector control method using a position sensor such as an optical encoder or a resolver, or a sensorless method for estimating a position at a current value flowing on each phase.

For example, in the case of a 120 degree conduction control method, when the position signal of the rotor 30 is detected by the Hall elements H1 to H3, the motor driving circuit control unit (not shown) turns on a pair of switching elements FET of the inverter circuit 55 according to one of the six conduction modes to establish a current flow path.

The following Table 1 is a logic table applied to selectively activate switching elements FET1 to FET6 of the inverter circuit 55 when driving the propeller driving motor 10 consisting of a BLDC motor in one of six conduction modes (i.e., six-step modes) according to the 120 degree conduction control method.

TABLE 1

| Electrical angle | 0° | 60° | 120° | 180° | 240° | 300° | 360°, 0° |
|---|---|---|---|---|---|---|---|
| Mechanical angle | 0° | 12° | 24° | 36° | 48° | 60° | 72°, 0° |
| H1 | N | S | S | S | N | N | N |
| H2 | N | N | N | S | S | S | N |
| H3 | S | S | N | N | N | S | S |
| Input | V | V | W | W | U | U | V |
| Output | W | U | U | V | V | W | W |
| Upper FET | FET3 | FET3 | FET5 | FET5 | FET1 | FET1 | FET3 |
| Lower FET | FET2 | FET4 | FET4 | FET6 | FET6 | FET2 | FET2 |

FETs (FET1 to FET6) are each connected in a totem pole manner, and outputs U, V, and W of the respective phases are generated from the respective connection points between one of the upper FETs (FET1, FET3, and FET5) and one of the lower FETs (FET4, FET6, and FET2), and are applied to the stator coils U1-U6, V1-V6, and W1-W6 of the propeller driving motor 10. When the propeller driving motor 10 employs a three-phase driving method, the stator 40 includes 12 coils (U1-U12, W1-W12, and V1-V12) connected in parallel for each phase as shown in FIG. 7A, that is, first to twelfth core groups G1 to G12, and each core group is formed by winding a wire in a three-connection method in which the wire is wound in three consecutive split cores 410 in a forward direction, a reverse direction, and a forward direction.

The propeller driving motor 10 selectively drives two of three pairs of switching elements of the inverter circuit 55 based on the rotor position signal detected by the Hall elements H1 to H3 and applies current to two of the U-phase, V-phase, and W-phase coils (core groups) sequentially, thereby generating a rotating magnetic field by sequentially exciting two-phase stator coils to thus cause rotation of the rotor. That is, a driving signal is applied to one-phase coils (core group) from an output of the inverter circuit 55, and is applied to the other one-phase coils (core group) via the neutral point NP.

For example, when three Hall elements H1 to H3 detect the polarity of the rotor 30, the control unit of the motor driving circuit determines the rotational position of the rotor

30 based on a combination of the detected polarities of the rotor. When the rotational position of the rotor 30 is 0 degrees, and when the driving signal is applied so as to turn on the FET3 at the upper side and the FET2 at the lower side of the inverter circuit 55 on the basis of the first conduction mode, the current is supplied to the ground via the FET3—the parallel connection V-phase core groups G3, G6, G9, and G12—the neutral point—the parallel connection W-phase core groups G2, G5, G8, and G11—the FET2.

Accordingly, the first split core of each of the V-phase core groups G3, G6, G9, and G12 generates outward magnetic flux, the second split core generates inward magnetic flux, and the third split core generates outward magnetic flux, and a magnetic circuit circulating the magnet of the opposite rotor 30 is set, and as a result, the rotor 30 rotates clockwise.

In other words, in the propeller driving motor 10, the first to third split cores (teeth) with the V-phase coils V1 to V3 connected in a three-connection method serve as electromagnets, and the right part of the teeth is arranged oppositely in the same polarities as S-S, N-N, and S-S, with respect to the three magnets facing the rotor 30. Accordingly, a large repulsive force is generated between the first to third split cores (teeth) and the magnets of the rotor 30.

In addition, in an area relatively smaller than the right part of the first to third split cores (teeth), the left part of the teeth is arranged oppositely in the different polarities as S-N, N-S, and S-N, with respect to the three magnets facing the rotor 30 Accordingly, a small attractive force is generated between the first to third split cores (teeth) and the magnets of the rotor 30.

Therefore, since a small attractive force and a large repulsive force are simultaneously generated between the first to third split cores (teeth) and the rotor 30, an action of rotating the rotor 30 in a clockwise direction occurs.

In addition, in the core group G2 in which the W-phase coils W1 to W3 are connected by the three-connection method, which is arranged at the rear end and adjacent to the core group G3 in which the V-phase coils V1 to V3 are connected by the three-connection method, the left part of the teeth is arranged oppositely in the different polarities as N-S, S-N, and N-S, with respect to the three magnets facing the rotor 30, and the right part of the teeth is arranged oppositely in the same polarities as N-N, S-S, and N-N, with respect to the magnets facing the rotor 30. Therefore, since an attractive force and a repulsive force are generated between the first to third split cores (teeth) of the core group G2 and the magnets of the rotor 30, an action of rotating the rotor 30 in a clockwise direction occurs simultaneously.

Moreover, repulsive and attractive forces are generated in the same manner as the above even between the core group G9 with the three-connected V-phase coils V7 to V9 and the magnets of the rotor 30 and between the core group G8 with the three-connected W-phase coils W9 to W7 and the magnets of the rotor 30, in which the core group G9 and the core group G8 are arranged oppositely around the axis of rotation of the core group G3 with the three-connected V-phase coils V1 to V3 and the core group G2 with the three-connected W-phase coils W3 to W1. Therefore, the rotor 30 is rotated clockwise by actions of pushing and pulling the rotor 30.

Moreover, repulsive and attractive forces are generated in the same manner as the above even between the V-phase core group G12 and the magnets of the rotor 30 and between the W-phase core group G11 and the magnets of the rotor 30, in which the V-phase core group G12 and the W-phase core group G11 are arranged oppositely around the axis of rotation of the V-phase core group G6 and the W-phase core group G5. Therefore, the rotor 30 is rotated clockwise by actions of pushing and pulling the rotor 30.

Thereafter, the rotor 30 rotates by 12° at a mechanical angle (an electrical angle of) 60°, and the control unit determines the rotational position of the rotor 30 by detecting the polarity of the rotor 30 by the Hall elements H1 to H3. When the driving signal is applied so as to turn on the FET3 at the upper side and the FET4 at the lower side on the basis of the second conduction mode determined according to the rotational position of the rotor 30, the current is supplied to the ground via the FET3—the parallel connection V-phase core groups G3, G6, G9, and G12—the neutral point—the parallel connection U-phase core groups G1, G4, G7, and G10—the FET4.

Accordingly, even in the second conduction mode, the magnetic circuit is set similarly to the first conductive mode, and the rotor 30 is rotated in the clockwise direction.

In the propeller driving motor 10, the magnetic circuit path formed between the three consecutive split cores (teeth) of the stator and the three consecutive magnets of the rotor is due to a coil winding accomplished so that the second split core (teeth) wound in the reverse direction and the first and third split cores (teeth) wound in the forward direction among the three first to third split cores included in each core group, generate magnetic fluxes in opposite directions.

As a result, the current flow path set by the inverter circuit 55 is changed according to one of the six conduction modes, and Eight core groups of the 12 core groups G1 to G12 are placed facing each other at the same polarity or opposite polarities between the split core (teeth) serving as an electromagnet and the magnets of the rotor. Accordingly, a repulsive force and an attractive force act in the same direction to rotate the rotor in a preset direction.

As mentioned above, in the present invention, 12 core groups G1 to G12 are activated in two adjacent core groups (i.e., a pair of consecutive six split cores (teeth)) for each conduction mode, and one deactivated core group (i.e., three consecutive split cores (teeth)) is placed between two activated adjacent core groups. The eight activated core groups and the four deactivated core groups placed between the eight activated core groups are symmetrically placed around the axis of rotation, and the eight activated core groups generate magnetic fluxes that rotate the rotor in the same direction, resulting in effective force transfer to the rotor.

In addition, when the conduction mode is changed, the eight activated core groups and the four deactivated core groups placed between the eight activated core groups are set to eight activated core groups and four deactivated core groups with one core group moved along the rotation direction of the rotor. As a result, the rotor is continuously rotated in the same direction by a rotating magnetic field.

In addition, in the present invention, two consecutive core groups (i.e., six teeth) are simultaneously activated, and the six activated teeth generate magnetic fluxes in opposite directions, and thus even when a boundary surface is arranged between adjacent S-pole and N-pole magnets in the rotor 30 facing the teeth of the stator, an effective magnetic circuit path is set without magnetic flux loss to rotate and drive the rotor 30. As a result, split-magnetized magnets may be used without rounding the corners of adjacent S-pole and N-pole magnets, and thus the effective area of the magnet corresponding to the teeth increases, and efficiency may be increased.

In addition, in the present invention, coil winding is performed such that a pair of six consecutive split cores generate magnetic fluxes in opposite directions between adjacent split cores, and as the driving signal is applied, even if an interval between one core and another core is set small, there is no magnetic flux leakage due to cogging. The effective area between the magnet and the core (teeth) is increased to reduce the leakage magnetic flux, thereby promoting efficiency.

In this invention, even if the respective tooth are not rounded, and the curvature is set to coincide with one outer circle formed by the entire 36 teeth, cogging does not occur significantly. As a result, the effective area between the magnet and the core (teeth) is increased at the maximum to reduce the leakage magnetic flux, thereby promoting efficiency.

In the stator 40 of the present invention, one core group is formed by assembling the upper and lower insulators 42a and 42b in each of the plurality of split cores 410, and then winding a wire in a three-connection method to be wound in a forward, reverse, and forward direction on the three consecutive split cores 410 in which the upper and lower insulators 42a and 42b are assembled.

The plurality of core groups G1 to G12 form an annular primary temporary assembly using an uneven coupling part of the back yoke part, assemble the bus bar bracket and the bus bar in the primary temporary assembly, and connect both ends of the coil to the bus bar to form a secondary temporary assembly 40a. Thereafter, the secondary temporary assembly 40a forms the stator support 44 by insert molding to form the integrated stator 40.

In this case, the upper and lower insulators 42a and 42b and the stator support 44 may preferably include an insulating heat dissipation composite material having both heat dissipation performance and insulation performance. When the driving motor 10 is employed in an aircraft, the motor 10 is required to have at least 10 kV of insulation performance so as to be safe from lightning, and the thermal conductivity of the motor 10 is preferably about 3 W/mK or more in consideration of heat dissipation characteristics.

Considering the above, the insulating heat dissipation composite material used in this invention includes a polymer matrix with a continuous use temperature of about 150° C. or higher and serving as a binder, an insulating heat dissipation filler made of ceramic added and dispersed to improve thermal conductivity, and a reinforcing fiber added to reinforce strength.

The polymer matrix may include one compound, a mixture of two or more thereof, or a copolymer thereof, selected from the group consisting of polyamide, polyester, polyketone, liquid crystal polymer, polyolefin, polyphenylene sulfide (PPS), polyether ether ketone (PEEK), polyphenylene oxide (PPO), polyethersulfone (PES), polyetherimide (PEI), and polyimide.

In this case, the polymer matrix may have a continuous use temperature of about 150° C. or higher, and, for example, may employ polyphenylene sulfide (PPS).

In addition, the insulating heat dissipation filler may be provided in an amount of about 75 to about 100 parts by weight based on about 100 parts by weight of the polymer matrix.

In addition, the insulating heat dissipation filler may include at least one selected from the group consisting of magnesium oxide, talc, titanium dioxide, aluminum nitride, silicon nitride, boron nitride, aluminum oxide, silica, zinc oxide, barium titanate, strontium titanate, beryllium oxide, silicon carbide, and manganese oxide.

An average particle diameter of the insulating heat dissipation filler may be approximately 10 nm to 600 μm.

Furthermore, the reinforcing fiber may be provided in an amount of about 30 parts by weight based on about 100 parts by weight of the polymer matrix, and for example, glass fibers and the like may be used.

an insulating heat dissipation composite with both heat-dissipating performance and insulating performance are combined as shown in Table 2 below to prepare three Experimental Examples and measure the temperature of each phase according to samples of the Experimental Examples. The measured temperatures are illustrated in Table 2.

TABLE 2

|  | Whether or not heat dissipation plastic is applied | Whether or not heat dissipation stator support is applied | U-phase temperature [° C.] | V-phase temperature [° C.] | W-phase temperature [° C.] |
|---|---|---|---|---|---|
| Experimental Example 1 | X | X | 160.2 | 158.5 | 153.7 |
| Experimental Example 2 | ○ | X | 134.8 | 136.4 | 131.2 |
| Experimental Example 3 | ○ | ○ | 104.2 | 103.0 | 88.4 |

In addition, the insulating composite material may further include at least one additive selected from the group consisting of a dispersant, an antioxidant, a work enhancer, a coupling agent, a stabilizer, a flame retardant, a pigment, and an impact modifier.

In the present invention, heat dissipation performance may be maximized by varying compositions of a first insulating heat dissipation composite used to form the insulators 42a and 42b that insulate between the stator core and the coil and a second insulating heat dissipation composite used to form the stator support 44.

In other words, the upper and lower insulators 42a and 42b, which are formed of the first insulating heat dissipation composite material, collect the generated heat into the stator core, and the upper and lower insulators 42a and 42b are separately manufactured by injection molding and then assembled to the stator core 41. Therefore, it is difficult to form the upper and lower insulators 42a and 42b into a thin film structure to exhibit minimal impact strength characteristics, and it is required to have excellent moldability, resulting in relatively poor thermal conductivity characteristics.

That is, when the content of the heat dissipation filler is increased to exhibit higher heat dissipation performance (i.e., thermal conductivity), the first insulating heat dissipation composite material may cause a problem of poor impact strength characteristics and moldability.

In contrast, the stator support 44 formed of the second insulating heat dissipation composite material may be formed by an insert molding method to insulate spaces between the coils while surrounding the stator coil 43 wound around the insulators 42a and 42b.

Therefore, the stator support 44 is formed and integrated to coat spaces between the coils while surrounding the stator coil 43 by insert molding instead of the injection molding, and thus, the composition of the second insulating heat dissipation composite material used therefor may also have lower impact strength characteristics and moldability than the composition of the first insulating heat dissipation composite material. Therefore, it is possible to increase the content of the heat dissipation filler so as to exhibit higher heat dissipation performance (i.e., thermal conductivity).

<Stator Heat Dissipation Characteristic Test>

According to the present invention, whether to apply an insulating heat dissipation composite as heat-dissipating plastic to the insulator of the stator and whether to apply an insulating heat dissipation stator support insert-molded with Experimental Example 1 is a motor consisting of a combination of a stator and a rotor in which an insulating heat dissipation composite as a heat dissipation plastic is not applied to an insulator of the stator, and no heat dissipation stator support is formed. Experimental Example 2 is a motor in which an insulating heat dissipation composite material as a heat dissipation plastic is applied to an insulator of a stator, and to which a heat dissipation stator support is applied. Experimental Example 3 is a motor in which an insulating heat dissipation composite material as a heat dissipation plastic is applied to an insulator of a stator, and to which a heat dissipation stator support is applied. The Experimental Example sample motors are, for example, large BLDC motors of 65 kV and 16 kg. The test conditions follow: a number of revolutions per minute (RPM) of 3,000 RPM; load conditions of 30 kW, 100 Nm, and 130 A; a coolant temperature of 50° C.; and a coolant circulation flow rate of 51 pm. The motors were driven to saturation temperature.

In the case of Experimental Example 1 in which the insulating heat dissipation composite material was not applied to the insulator of the stator as heat dissipation plastic, polyether ether ketone (PEEK), which is an injection-molded compound having high heat resistance and chemical resistance, was applied thereto. A composite of 40 wt % of polyphenylene sulfide (PPS) as a polymer matrix, 30 wt % of talc as a heat dissipation filler, and 30 wt % of glass fiber as a reinforcing fiber, was used as the insulating heat dissipation composite material in the case of Experimental Example 2 applied as the heat dissipation plastic to the insulator of the stator. The insulating heat dissipation composite material applied to the insulator and stator support of Experimental Example 3 was the same as the insulating heat dissipation composite material of Experimental Example 2.

Figure 11:
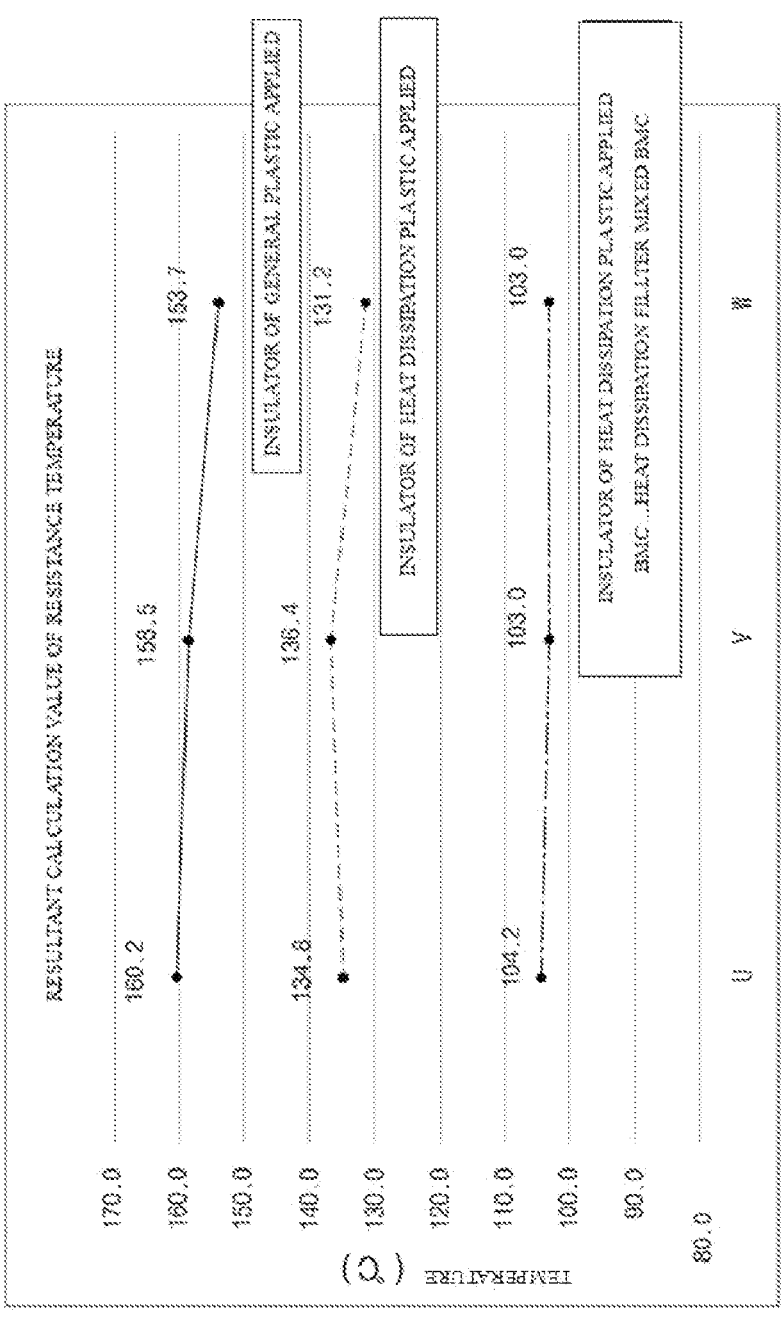
FIG. 11 is a graph showing temperature for each phase of an example in which an insulator includes an insulating heat dissipation composite material according to the present invention and a comparative example in which heat dissipation plastic is not applied.

The temperature measurement is shown in Table 2 by calculating the temperature by a saturation temperature test result resistance measurement value for each phase of U, V, and W, and is shown in a graph in FIG. 11.

Here, the saturation temperature represents the temperature when maintained for 5 minutes or more within the average temperature deviation ±1° C.

As a result of the saturation temperature test for each phase of U, V, and W, as shown in Table 2, Experimental Example 3 with both heat dissipation insulator and heat dissipation stator support was found to have lower temperatures by 56° C. in the U phase, 55.5° C. in the V phase, and 50.7° C. in the W phase compared to Experimental Example 1 without both heat dissipation insulator and heat dissipation stator support.

Based on the average temperature, Experimental Example 1 was 157.5° C., Experimental Example 2 was 134.1° C., Experimental Example 3 was 103.4° C., and Experimental Example 3 was found to have an excellent heat dissipation effect by reducing the saturation temperature by 54.1° C. (34.3%) compared to Experimental Example 1.

As a result of the heat dissipation characteristic test of the stator, the size may be reduced by designing a high current density during design of motors, and the motor may be designed more stably when the temperature of the entire system is lowered.

As described above, in the present invention, a plurality of split cores 410 are assembled into insulators 42a and 42b formed of an insulating heat dissipation composite material, and the three-phase driving coils U1-U12, W1-W12, and V1-V12 are wound in a three-connection manner. Thereafter, the stator support 44 is formed by insert molding the plurality of coil-wound split cores 410 with an insulating heat dissipation composite material. Accordingly, the stator support 44 is integrated and sealed in an annular shape to provide a heat dissipation effect, as well as to fundamentally solve the occurrence of an electrical short even if moisture or foreign substances flow into the motor along an inner air cooling flow path.

In addition, in this invention, by minimizing the resistance of the coil 43 between respective core groups G1 to G12 when winding the coil in a three-connection method, resistance and coil loss may be reduced to lower the coil temperature and increase efficiency. As described above, in the case of winding the coils U1-U12, W1-W12, and V1-V12 in a three-connection method and connecting the three-connected split cores 410 in parallel for each of the core groups G1 to G12, the start terminals of the coils U1-U12, W1-W12, and V1-V12 wound around the split cores 410 are connected to the three-phase terminal terminals U, V, and W of the inverter circuit 55, and the end terminals thereof are connected to the common electrode terminal COM.

Moreover, when manufacturing a motor with a 36-slot/32-pole structure as in this invention, 12 core groups G1 to G12 consisting of three split cores 410 which are three-connected need to connect start and end terminals of a coil to a terminal for each phase or a common electrode terminal.

In addition, in the case of a high-power motor, when a large amount of current flows from the terminal to the stator coils U1-U12, W1-W12, and V1-V12, it is preferable to use bus bars 49a to 49c for each phase in order to provide circuit stability at electrical connection points between start terminals and end terminals of the coils U1-U12, W1-W12, and V1-V12 even during high-temperature heat generation.

Moreover, when 12 core groups G1 to G12 consisting of three-connected three spit cores 410 are connected to form a circuit in a parallel connection method, the start terminals and end terminals of the coils U1-U12, W1-W12, and V1-V12 of each of the core groups G1 to G12 are connected to multiple bus bars using a plurality of bus bars 49a to 49c. In this case, it is preferable to use a plurality of bus bar brackets 47a to 47l to fix the plurality of bus bars 49a to 49d in order to keep a preset position stable, when insert-molding an insulating heat-radiating composite material so as to integrate the core groups into an annular shape.

In the present invention, which implements a high-power motor as described above, 36 split cores 410 are assembled with the insulators 42a and 42b, and the coils U1-U12, W1-W12, and V1-V12 are wound in a three-connection method, and then to insert-mold the split cores with an insulating heat-dissipating composite material to then be integrated in an annular form while forming a circuit in a parallel connection method of four core groups for each phase, it is an important factor to use the bus bars 49a to 49d and bus bar brackets 47a to 47l in increasing assembly productivity and improving durability of the connection part.

In other words, after assembling the insulators 42a and 42b into the 36 split cores 410, the 12 coil-wound core groups G1 to G12 are temporarily assembled in an annular form on the mold for insert molding and insert molding with an insulating heat dissipation composite material. In this case, if there is no support from the bus bars 49a to 49d and the bus bar bracket 47a to 47l maintaining the temporary assembly state, the predetermined position may not be maintained by the pressure during molding.

In this invention, when coils U1-U12, W1-W12, and V1-V12 are wound around the plurality of split cores 410 and an annular stator 40 integrated by insert molding in an annular state of temporary assembly is manufactured, a method of manufacturing a stator is provided by comprehensively considering the three connections of coils for introducing bus bars required for high-power driving motors, increasing motor efficiency, and reducing noise and vibration generation while strengthening insufficient coupling force due to the uneven coupling structure of the back yoke part 41a of the split cores 410.

In this invention, three-phase coils U1-U12, W1-W12, and V1-V12 are wound on the teeth 41b of the split core 410 in a three-connection method of continuously winding the coil on the three consecutive teeth 41b in the order of forward, reverse and forward for each core group of each phase. Accordingly, when a motor driving signal of the same phase is applied to three consecutive coils, all three split cores (teeth) 410 generate a magnetic flux that rotates the magnet 32 of the opposite rotor 30 in the same direction, thereby effectively transferring force to the rotor 30.

Moreover, in the present invention, coil winding is performed in a three-connection method, so that the three split cores (teeth) 410 operate like one set. Thus, even if there is an overlap between the adjacent S-pole and N-pole magnets in the single rotor facing the leading end of the split cores (teeth) 410, an effective magnetic flux path is set to increase the effective area of the magnet and to increase efficiency.

According to the present invention, the winding direction and the driving signal of the three-phase driving circuit are switched so that the adjacent split cores (teeth) 410 generate magnetic flux in opposite directions to each other. Accordingly, attractive force and repulsive force are simultaneously generated in the same direction with respect to the rotor set to have opposite polarities, and thus rotation driving of the single rotor may be effectively carried out.

In the description of the embodiment, the driving of the propeller driving motor 10 according to the 120 degree conduction control method has been described, but may be driven in a sensorless method.

In the present invention, an example in which a propeller driving motor rotationally drives a propeller of a light aircraft has been described, but the present invention may be applied to a drone in which a single propeller driving motor is installed on a drone body or a multicopter-type drone is installed on a plurality of arms extending from the drone body.

In addition, the present invention may be variously changed for various purposes, such as a logistics field, a surveillance/reconnaissance/search, a disinfection/control/ spray, broadcast/performance, an environmental measurement, a structure, and the like, in which a distribution box for delivery of parcel goods is detachably equipped at a lower portion of a drone body.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention may be applied to a propeller driving motor for a light aircraft or drone or a motor for an electric vehicle.

What is claimed is:
1. A stator having a bus bar structure, the stator comprising:
  a split type state core in which a plurality of split cores, each tooth extending in a center direction from a back yoke part forming a magnetic circuit, are annularly assembled;
  an upper insulator and a lower insulator which are combined to surround an outer peripheral surface of the teeth of the split cores from above and below;
  a three-phase driving type stator coil which is wound around an outer circumference of each of the upper insulator and the lower insulator and includes a plurality of core groups which are continuously wound around three teeth adjacent for each phase, wherein the core groups on each phase are connected in parallel and are alternately arranged for each phase;
  a plurality of bus bar brackets coupled to one of the upper insulator and the lower insulator so as to bind two adjacent split cores, respectively, and each having four guide channels;
  U-phase, W-phase, and V-phase bus bars, each inserted and fixed to one of the four guide channels, in which a plurality of connection terminals to which start terminals of each core group are connected, protrude at intervals;
  a common electrode bus bar inserted into one of the four guide channels to be fixed, in which a plurality of connection terminals to which end terminals of each core group are connected, protrude at intervals; and
  a stator support which surrounds the stator coil wound on the insulators so as to integrate the plurality of split cores, and insulates between adjacent coils,
  wherein the plurality of bus bar brackets are positioned to bind a front end insulator coupled to a rear end split core of a front core group among adjacent core groups and a rear end insulator coupled to a front end split core of a rear end core group, and
  wherein each of the bus bar brackets has first and second coupling holes coupled to coupling protrusions of the insulators, respectively, a first coupling protrusion of the front insulator and a second coupling protrusion of the rear insulator are coupled to the first and second coupling holes, respectively, and an insulator not coupled to the bus bar bracket is arranged before and after the front insulator and the rear insulator coupled to the bus bar bracket.

2. The stator having a bus bar structure of claim 1, wherein the upper insulator and the lower insulator include a pair of flanges protruding inward and outward, and a coil winding region formed between the pair of flanges having a hollow part surrounding a teeth therein, and a coupling protrusion required to couple and fix the bus bar bracket protrudes from an outer flange of the lower insulator.

3. The stator having a bus bar structure of claim 1, wherein each of the bus bar brackets comprises: a rectangular base part; inner and outer side walls protruding from an inner circumference and an outer circumference of the base part, respectively; three-row guide protrusions protruding to form four guide channels to which U-phase, V-phase, and W-phase bus bars and a common electrode bus bar are coupled and fixed between the inner side wall and the outer side wall; and first and second protrusion parts protruding from both ends of the outer side wall and having first and second coupling holes respectively coupled to the coupling protrusions of the lower insulator.

4. The stator having a bus bar structure of claim 1, wherein the U-phase, V-phase, and W-phase bus bars each have a plurality of connection terminals protruding in which an output terminal to which one end of a cable is connected and start terminals of a plurality of core groups allocated on the U-phase, V-phase, and W-phase, are connected,
  the common electrode bus bar has a plurality of connection terminals to which a plurality of end terminals of the plurality of core groups are connected and an output terminal for a common electrode to which one end of the cable is connected, in which the plurality of connection terminals and the output terminal for a common electrode protrude, and
  the output terminals of the U-phase, V-phase, and W-phase bus bars, the plurality of connection terminals to which the start terminals of each core group are connected, the plurality of connection terminals of the common electrode bus bars, and the output terminal for the common electrode have intervals which are set to be located in the guide channels of the bus bar brackets.

5. The stator having a bus bar structure of claim 4, wherein one of the plurality of connection terminals of U-phase, W-phase, and V-phase bus bars, to which a start terminal of the core group for each U-phase, each V-phase, and each W-phase is connected, and one of the plurality of connection terminals of a common electrode bus bar to which an end terminal of each of the plurality of core groups is connected are arranged in each of the plurality of bus bar brackets, and the connection terminal is arranged at a position close to the start terminal and the end terminal of each core group arranged in an annular shape to minimize a coil length.

6. The stator having a bus bar structure of claim 1, wherein six successive teeth included in the core groups of two adjacent phases generate magnetic flux in opposite directions to rotate the magnet of the rotor arranged opposite to each other in the same direction.

7. The stator having a bus bar structure of claim 1, wherein: the stator coil includes 12 core groups; the core groups in each phase are connected in parallel by four; two adjacent core groups are activated for each conduction mode; one deactivated core group is arranged between the two activated adjacent core groups; and the activated eight core groups and the deactivated four core groups arranged therebetween are symmetrically arranged around a rotating shaft.

8. A propeller driving motor comprising:

a housing in which an upper cover and a lower cover are respectively coupled to an upper portion and a lower portion of a cylindrical case;

a stator according to claim 1 and arranged inside the cylindrical case of the housing and generating a rotating magnetic field; and a rotor rotated by the rotating magnetic field generated from the stator; and a rotary shaft coupled to the center of the rotor and having a propeller coupled to a front end thereof.

9. The propeller driving motor of claim 8, wherein the driving motor comprises a plurality of through holes provided in the upper cover from the outside, a plurality of spaces formed between a plurality of bridges connecting the rotating shaft and the rotor, and a plurality of through holes provided in the lower cover.

10. The propeller driving motor of claim 8, wherein the rotor comprises upper and lower blade support plates installed at a top and a bottom thereof, and each of the upper and lower blade support plates comprises a plurality of blades that generate a circumferential wind when the rotor rotates, and the circumferential wind collides with the air cooling air flow penetrating the motor to generate a vortex.

11. The propeller driving motor of claim 8, further comprising a water jacket having a spiral refrigerant circulation circuit placed between the cylindrical case and the stator and capable of refrigerant circulation between the case and the water jacket, wherein the stator support has heat dissipation through the water jacket installed on the outside.

12. The propeller driving motor of claim 8, wherein the insulator and the stator support of the stator comprise an insulating heat dissipation composite material having heat dissipation performance and insulation performance at the same time, and the insulating heat dissipation composite material has an insulation performance of at least 10 kV and a thermal conductivity of 3 W/mK or more.

13. A stator having a bus bar structure, the stator comprising:

a split type state core in which a plurality of split cores, each tooth extending in a center direction from a back yoke part forming a magnetic circuit, are annularly assembled;

an upper insulator and a lower insulator which are combined to surround an outer peripheral surface of the teeth of the split cores from above and below;

a three-phase driving type stator coil which is wound around an outer circumference of each of the upper insulator and the lower insulator and includes a plurality of core groups which are continuously wound around three teeth adjacent for each phase, wherein the core groups on each phase are connected in parallel and are alternately arranged for each phase;

a plurality of bus bar brackets coupled to one of the upper insulator and the lower insulator so as to bind two adjacent split cores, respectively, and each having four guide channels;

U-phase, W-phase, and V-phase bus bars, each inserted and fixed to one of the four guide channels, in which a plurality of connection terminals to which start terminals of each core group are connected, protrude at intervals;

a common electrode bus bar inserted into one of the four guide channels to be fixed, in which a plurality of connection terminals to which end terminals of each core group are connected, protrude at intervals; and a stator support which surrounds the stator coil wound on the insulators so as to integrate the plurality of split cores, and insulates between adjacent coils, wherein: the stator coil includes 12 core groups; the core groups in each phase are connected in parallel by four; two adjacent core groups are activated for each conduction mode; one deactivated core group is arranged between the two activated adjacent core groups; and the activated eight core groups and the deactivated four core groups arranged therebetween are symmetrically arranged around a rotating shaft.

\* \* \* \* \*